(12) United States Patent
Xiao et al.

(10) Patent No.: US 7,405,015 B2
(45) Date of Patent: *Jul. 29, 2008

(54) IONOMER FOR USE IN FUEL CELLS AND METHOD OF MAKING SAME

(75) Inventors: Guyu Xiao, Shanghai (CN); Guomin Sun, Shanghai (CN); Deyue Yan, Shanghai (CN); Xinyuan Zhu, Shanghai (CN); Charles W. Martin, Avondale, PA (US); Huey Wu, Newark, DE (US); Karine Gulati, Mission Viejo, CA (US); Carlos Alberto Cavalca, Newark, DE (US)

(73) Assignee: Gore Enterprise Holdings, Inc., Newark, DE (US)

( * ) Notice: Subject to any disclaimer, the term of this patent is extended or adjusted under 35 U.S.C. 154(b) by 718 days.

This patent is subject to a terminal disclaimer.

(21) Appl. No.: 10/481,226

(22) PCT Filed: Jul. 5, 2002

(86) PCT No.: PCT/US02/21346

§ 371 (c)(1),
(2), (4) Date: Nov. 22, 2004

(87) PCT Pub. No.: WO03/005474

PCT Pub. Date: Jan. 16, 2003

(65) Prior Publication Data

US 2005/0079399 A1  Apr. 14, 2005

(30) Foreign Application Priority Data

Jul. 5, 2001  (CN) ................................. 01 1 13257
Apr. 25, 2002  (CN) ................................. 02 1 11491

(51) Int. Cl.
*H01M 8/10* (2006.01)
*H01M 4/86* (2006.01)
*C08J 5/22* (2006.01)

(52) U.S. Cl. .............................. 429/33; 429/42; 521/25
(58) Field of Classification Search ................... 429/33, 429/42, 314, 316, 317; 521/25
See application file for complete search history.

(56) References Cited

U.S. PATENT DOCUMENTS 3,282,875 A  11/1966  Connolly et al. ........... 260/29.6

(Continued)

FOREIGN PATENT DOCUMENTS

CN  01113257.4  7/2001

(Continued)

OTHER PUBLICATIONS

"Thin Film Composite (TFC) Membranes With Improved Thermal Stability From Sulfonated Poly (Phthalazinone Ether Sulfone Ketone) (SPPESK)" Ying Dai, Xigao Jian, Shouhai Zhang, Michale Guiver, Journal of Membrane Science 207 (2002) pp. 189-197, no month.

(Continued)

*Primary Examiner*—Stephen J. Kalafut
(74) *Attorney, Agent, or Firm*—Allan M. Wheatcraft

(57) ABSTRACT

The reaction product of a monomer comprising phthalazinone and a phenol group, and at least one sulfonated aromatic compound. The monomer comprising phthalazinone and a phenol group is used in a reaction with the sulfonated aromatic compound to produce ionomers with surprising and highly desirable properties. In one embodiment, the inventive ionomer is a sulfonated poly(phthalazinone ether ketone), hereinafter referred to as sPPEK. In another embodiment, the inventive ionomer is a sulfonated poly(phthalazinone either sulfone), herein after referred to as SPPES. In another embodiment, the inventive ionomer is other sulfonated aromatic polymeric compounds. The invention further includes the formation of these polymers into membranes and their use for polymer electrolyte membrane fuel cells (PEMFC), and in particular for direct methanol fuel cells (DMFC). The inventive polymers may be manufactured in membrane form, and can be dissolved into solution and impregnated into porous substrates to form composite polymer electrolyte membranes with improved properties.

54 Claims, 7 Drawing Sheets

U.S. PATENT DOCUMENTS

| | | | |
|---|---|---|---|
| 3,953,566 A | 4/1976 | Gore | 264/288 |
| 4,083,768 A | 4/1978 | Lee et al. | 204/296 |
| 4,320,224 A | 3/1982 | Rose et al. | 528/125 |
| 4,358,545 A | 11/1982 | Ezzell et al. | 521/27 |
| 4,940,525 A | 7/1990 | Ezzell et al. | 204/252 |
| 5,237,062 A | 8/1993 | Hay | 544/237 |
| 5,254,663 A | 10/1993 | Hay | 528/86 |
| 5,306,789 A | 4/1994 | Hay et al. | 525/471 |
| 5,525,436 A | 6/1996 | Savinell et al. | 429/30 |
| 5,547,551 A * | 8/1996 | Bahar et al. | 429/33 X |
| 5,882,810 A * | 3/1999 | Mussell et al. | 429/33 |
| 6,025,085 A | 2/2000 | Savinell et al. | 429/33 |
| 6,087,031 A | 7/2000 | Iwasaki et al. | 429/33 |
| 6,099,988 A | 8/2000 | Savinell et al. | 429/189 |
| 6,258,861 B1 | 7/2001 | Steck et al. | 521/27 |
| 6,365,294 B1 | 4/2002 | Pintauro et al. | 429/33 |
| RE37,701 E | 5/2002 | Bahar et al. | 442/171 |
| RE37,707 E | 5/2002 | Bozzini et al. | 257/675 |
| RE37,756 E | 6/2002 | Chen et al. | 428/421 |
| 6,399,254 B1 | 6/2002 | Kono et al. | 429/304 |
| 7,297,429 B2 * | 11/2007 | Cavalca et al. | 429/33 |

FOREIGN PATENT DOCUMENTS

| | | |
|---|---|---|
| CN | 02111491.9 | 4/2002 |
| WO | WO 96/13872 | 5/1996 |
| WO | WO 98/22989 | 5/1998 |
| WO | WO 00/77874 | 12/2000 |
| WO | WO 02/25764 | 3/2002 |

OTHER PUBLICATIONS

"Novel Aromatic Macrocyclic Oligomers: Intermediates for the Preparation of High-Performance Polymers", Yi-Feng Wang, Kwok P. Chan, Allan S. Hay, Reactive & Functional Polymers 30 (1996), pp. 205-227, no month.

"Thermostable Ultrafiltration and Nanofiltration Membranes From Sulfonated Poly (Phthalazinone Ether Sulfone Ketone)", Ying Dai, Xigao Jian, Shouhai Zhang, Michael D. Guiver, Journal of Membrane Science 188 (2001), pp. 195-203, no month.

"The Sodium Salts of Sulphonated Poly ( aryl-ether-ether-ketone) (PEEK): Preparation and Characterization," Polymer, 1987, vol. 28, pp. 1009, no month.

Fuel Cell Handbook, A. J. Appleby and F. R. Foulkes, Table 10-1, pp. 288 (1989), no month.

"Sodium Sulfonate-Functionalized Poly (ether ether ketone)s", F. Wang, T. Chen, J. Xu, Macromol. Chem. Phys. 1998, 1421-1426 (1998), no month.

"Effect of Post Treatment of Sulfonated Poly (arylene ether sulfone) Copolymer on Proton Conductivity," Y. S. Kim, F.Wang M. Hickner, T. A. Zawodzinski, and J. E. McGrath, Abstract No. 1892, The Electrochemical Society MeetingAbstracts, vol. 2002-1, no month.

"Methanol Cross-Over in Direct Methanol Fuel Cells", X Ren, T. Zawodzinski, F. Uribe, H. Dai, and Gottesfeld, Electrochemical Society Proceedings vol. 95-23, p. 284-298, no month.

"Application of Poly(phthalazinone ether sulfone ketone)s to Gas Membrane Separation," X Jian, Y Dai, L Zeng, R. X. Xu, Journal of Applied Polymer Science, vol. 71, 2385-2390 (1999), no month.

"Synthesis and Properties of Poly (aryl ether sulfone)s Containing the Phthalazinone Moiety," Y Meng, A Hay, X Jian, S Tjong, Journal of Applied Polymer Science, vol. 68, 137-143 (1998), no month.

* cited by examiner

IONOMER FOR USE IN FUEL CELLS AND METHOD OF MAKING SAME

FIELD OF THE INVENTION

This invention relates to an ionomer and its use as an electrolyte or electrode component in a fuel cell, and particularly in a direct methanol fuel cell (DMFC).

BACKGROUND OF THE INVENTION

Solid polymer electrolytes or films have been well known in the art for many years. These polymers are typically characterized by high ionic conductivity, herein defined as greater than $1 \times 10^{-6}$ S/cm. Such high conductivity values make them valuable where rapid transport of ionic species, for example, protons, is useful, for example in fuel cells. Additionally, it is desirable for such ionically conducting polymers to be made in the form of membranes or thin films. In so doing, the resistance to ionic transport, which is a function of the film thickness, can be reduced. These materials must also function in the temperature range of interest, which can vary from below room temperature up to a large fraction of the melting temperature of the polymer, depending on the application. Additionally, the polymer must be robust mechanically, so that it does not crack, either during installation in a fuel cell, or during use.

The use of ionomers as solid polymer electrolytes in fuel cells is well known, having been developed in the 1960s for the US Gemini space program. Historically, the industry has moved from phenol sulfonic materials, which suffered from poor mechanical and chemical stability; to polystyrene sulfonic acid polymers, which have improved mechanical stability, but still suffer chemical degradation; to poly(trifluorostyrene)sulfonic acid, which has improved chemical stability, but poor mechanical stability; to perfluorinated sulfonic acid materials (commercially available as NAFION® membranes), which has improved mechanical and chemical stability [e.g., see A. J. Appleby and F. R. Foulkes, *Fuel Cell Handbook*, Van Nostrand Reinhold, New York, 1989; Table 10-1, pg. 268].

The perfluorinated sulfonic acid materials, for example those disclosed in U.S. Pat. No. 3,282,875, U.S. Pat. No. 4,358,545 and U.S. Pat. No. 4,940,525, are still far from ideal ionomers. These materials must be hydrated to conduct protons at an acceptable rate. As a result, in dry conditions or at temperatures above 100 degrees C., they work poorly in hydrogen-oxygen or hydrogen-air fuel cells. Furthermore, these fluoropolymer ionomers are expensive to produce because of the inherently high cost of the fluorinated monomers required for their preparation. Finally, as more fully described below, they tend to have a high permeability to methanol, and therefore are inefficient electrolytes for use in direct methanol fuel cells.

These limitations have led to the development of several classes of ionomers that are not substantially fluorinated, but rather are based upon aromatic or linear polymers. In U.S. Pat. No. 4,083,768 a polyelectrolyte membrane is prepared from a preswollen membrane containing an insoluable cross-linked aromatic polymer. Although these membranes have low ionic resistance, the controlled penetration of the functional groups during preparation can make preparation difficult. In U.S. Pat. No. 5,525,436, U.S. Pat. No. 6,025,085 and U.S. Pat. No. 6,099,988 the preparation and use of polybenzimidizole membranes as ionomers is disclosed. These polymers are described as particularly suitable for use at temperatures above 100 degrees C. U.S. Pat. No. 6,087,031 discloses a ionomer comprising a sulfonated polyethersulfone that is suitable for use in a fuel cell. Kono et. al. discloses in U.S. Pat. No. 6,399,254 a solid electrolyte having a reduced amount of non-cross-linked monomer that can be rapidly cured through exposure to active radiation and/or heat and has high conductivity. Finally, Wang et. al. have disclosed in WO 0225764 ionomers made by direct polymerization of sulfonated polysulfones or polyimide polymers.

Other substantially non-fluorinated ionomers are those in the class of sulfonated Poly(aryl ether ketone)s. It is convenient to prepare sulfonated poly(aryl ether ketone)s by post-sulfonation. However, post-sulfonation results in the placement of the sulfonic acid group ortho to the activated aromatic ether linkage, where the sulfonate groups are relatively easy to hydrolyze. Moreover, only one sulfonic acid per repeat unit can be achieved. To overcome this limitation, a new route was developed to prepare sulfonated poly(aryl ether sulfone)s with monomer containing sulfonate groups derived from sulfonating the dihalide monomer. Sulfonation of the dihalide monomer, 4,4'-dihalobenzophenone and 4,4'-dihalodiphenylsulfone, results in sulfonic acid functionalization on both deactivated phenyl rings ortho to the halogen moiety, which offers them more chemical stability against desulfonation, and allows for two sulfonic acid groups per repeat unit of the resulting polymer. This approach displays other advantages, including being free from any degradation and cross-linking, and the ability to easily control the content of sulfonate groups by adjusting the ratios of the dihalide monomer to the sulfonated dihalide monomer.

In order to prepare ion exchange membrane for polymer electrolyte fuel cells (PEMFC) with excellent combined physical chemical properties and of low cost, attempts have been made by utilizing sulfonated poly(aromatic ether sulfone) and sulfonated poly(aromatic ether ketone). These membranes can be made by two methods. One is direct sulfonation of polymers, as reported in Polym. V28, P1009 (1987) wherein direct sulfonation of poly(aromatic ether ketone) to prepare sulfonated poly(aromatic ether ketone) was reported. This method is straightforward, but decomposition and crosslinking also occurred. The degree of sulfonation is also difficult to control. In addition, the sulfonated group directly attached to bisphenol-A could cause sulfonated group be hydrolyzed and detached from the polymer structure after prolong service at high temperature. Another method is to prepare sulfonated monomers first, followed by polymerization afterwards. Macrom. Chem. Phy., (1997), P1421 (1998) reported this method. First, sulfonated difluoro-benzophenone was obtained by sulfonation of difluoro-benzophenone, then it was mixed with some difluoro-benzophenone and bisphenol-A, followed by a copolymerization into sulfonated poly(aromatic ether ketone). The polymer structure is characterized by the following structure:

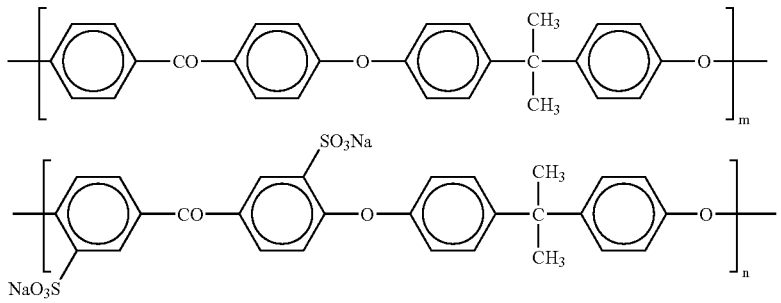

The polymerization process does not induce decomposition or crosslinking side reactions and it could control degree of sulfonation. The sulfonic acid groups located on the aromatic ring structure derived from benzophenone are much more stable than the ones on bisphenol-A rings. However, because of the existence of methyl group in the polymer structure, its anti-oxidation property is reduced. Furthermore, as the content of sulfonated group increases, swelling in water becomes very severe.

Recently, bisphenol A-based and phenolphthalein-based and 4,4'-thiodiphenol-based sulfonated poly(aryl ether ketone)s were prepared by another method. Generally, most homogeneous ionomers have the problem of large swelling degree at compositions where they have reasonable conductivity. So other components are blended with the polymer in order to obtain ionomer membranes with lower swelling.

One issue with many of these polymers is that the ionic conductivity is not as high as desirable. A high ionic conductivity in an ionomer is desirable because the higher the ionic conductivity, the lower the cell resistance when the polymer is used as the electrolyte in a fuel cell. Because lower cell resistance leads to higher fuel cell efficiency, lower resistance (or high conductance) is better. One approach to reducing the resistance of these ionomers is to reduce its thickness, as the resistance is directly proportional to thickness. Unfortunately, these ionomers cannot be made too thin because as they become thinner, they become more susceptible to physical or chemical damage, either during cell assembly or cell operation. One approach to deal with this issue has been disclosed in RE 37,707, RE 37,756 and RE 37,701 where ultra-thin composite membranes comprising expanded polytetrafluoroethylene and an ion exchange material impregnated throughout the membrane are disclosed. Composite ionomer membranes are also disclosed in U.S. Pat. No. 6,258, 861.

One further complication in the use of ionomers as solid polymer electrolytes in fuel cells is the need for the electrolyte to act as an impermeable barrier to the fuel. Should the fuel permeate through the electrolyte it reduces cell efficiency because the fuel that permeates through the electrolyte is either swept away into the outlet gas stream or chemically reacts on the oxidant side, giving rise to a mixed potential electrode. In either case, the fuel is not used for producing electricity. Furthermore, the fuel that permeates through the electrolyte may also poison the catalyst on the oxidizing side, further reducing the cell efficiency. This issue, called fuel crossover, is a particular problem when methanol is the fuel.

Methanol crossover rates tend to be high in many solid polymer electrolytes because the methanol absorbs and permeates in the polymer in much the same way that water molecules do. Since many solid polymer electrolytes transport water easily, they also tend to transport methanol easily. One approach to reducing methanol crossover is to simply use thicker membranes because the methanol transport-resistance (as defined below) increases with increasing thickness. This solution has limited utility, though, because as the thickness increases the ionic resistance of the membrane increases as well. Higher ionic resistance in the membrane is detrimental to fuel cell efficiency because it results in higher internal resistance and thus higher (iR) power losses. Therefore, the ideal membrane for direct methanol fuel cells would be one that has both very high methanol transport resistance and at the same time, has low ionic resistance. The combination of these two characteristics would allow the use of thicker membranes, leading to low iR power loss due to membrane resistance, while simultaneously minimizing the effect of methanol crossover.

The use of various polymers has been suggested to circumvent this methanol crossover issue. In WO 96/13872 the use of polybenzimidazole is suggested for direct methanol fuel cells. In WO 98/22989, a polymer electrolyte membrane composed of polystyrene sulfonic acid (PSSA) and poly(vinylidene fluoride) (PVDF) is reported to have low methanol crossover. In WO 00/77874 and U.S. Pat. No. 6,365,294 sulfonated polyphosphazene-based polymers are proposed as suitable ionomers for direct methanol fuel cells. Finally, poly (arylene ether sulfone) has been reported to have low methanol permeability [Y. S. Kim, F. Wang, M. Hickner, T. A. Zawodinski, and J. E. McGrath, Abstract No. 182, The Electrochemical Society Meeting Abstracts, Vol. 2002-1, The Electrochemical Society, Pennington, N.J., 2002]. Despite these attempts, a need still exists for an ionomer with lower methanol crossover rates and acceptably high ionic conductivity.

It is thus an object of this invention to satisfy the long-felt need for improved ionomers for use as a polymer electrolyte membrane and as an electrode component in fuel cells. It is also an object of the present invention to provide an improved method of forming a fuel cell using the inventive polymers. It is a further object of the invention to form a composite solid polymer electrolyte with improved properties comprising the inventive polymers and a support. It is yet another object of the invention to improve performance of a direct methanol fuel cell comprising the inventive polymers. Finally, it is also an object of the new invention to provide a fuel cell wherein the electrode comprises the inventive polymer.

SUMMARY OF THE INVENTION

This invention involves the reaction product of a monomer comprising phthalazinone and a phenol group, and at least one sulfonated aromatic compound. The monomer comprising phthalazinone and a phenol group is used in a reaction with the sulfonated aromatic compound to produce ionomers with surprising and highly desirable properties. In one embodiment, the inventive ionomer is a sulfonated poly(phthalazinone ether ketone), hereinafter referred to as sPPEK. In another embodiment, the inventive ionomer is a sulfonated poly(phthalazinone ether sulfone), herein after referred to as sPPES. In another embodiment, the inventive ionomer is other sulfonated aromatic polymeric compounds. The invention further includes the formation of these polymers into membranes and their use for PEMFC, and in particular for DMFC. The inventive polymers may be manufactured in membrane form, and can be dissolved into solution and impregnated into porous substrates to form composite solid polymer electrolytes with improved properties.

In one aspect, this invention provides an ionomer comprising the reaction product of monomer A (see below) with monomers B and C (also below), wherein the moles of monomers B plus C equal the moles of A, wherein $R_{1-4}$ are independently H, linear or branched alkyl, aromatic, or halogen; $X_1$ and $X_2$ are independently a carbonyl or sulfone radical or aromatic compounds connected through a ketone or sulfone linkage; Y is independently a halogen group, and M is an alkali metal.

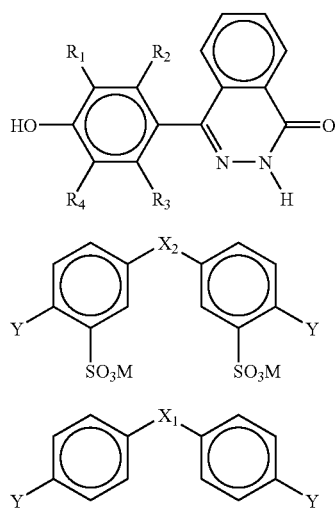

In another aspect, this invention provides an ionomer comprising the reaction product of monomer A with monomer B and C in an azeotroping solvent mixed with an inert aprotic polar solvent containing at least 2 moles of an alkali metal base for each mole of monomer A, wherein the moles of monomers B plus C equal the moles of A, said reaction driven to completion by the azeotropic removal of water at a temperature above the azeotropic boiling point of the azeotroping solvent in the presence of water, wherein $R_{1-4}$ are independently H, linear or branched alkyl, aromatic, or halogen; $X_1$ and $X_2$ are independently a carbonyl or sulfone radical or aromatic compounds connected through a ketone or sulfone linkage; and Y is a halogen group.

In another aspect, this invention provides an ionomer comprising the reaction product of monomer A with an ionomer-contributing monomer.

In another aspect, this invention provides a method of preparing a sulfonated poly(phthalazinone ether ketone) comprising the steps of (a) copolymerizing 4,4'-dihalo(or dinitro)-3,3'-disulfonate salt of benzophenone, dihalo (or dinitro) benzophenone, and a monomer containing phthalazinone and phenol group, in polar solvents or reaction medium containing mainly polar solvents, in the presence of a catalyst comprising a metallic base (or its salt), to obtain a product;
(b) dehydrating the product at high temperature using azeotropic dehydration agents;
(c) diluting the product with solvents;
(d) coagulating the product using coagulation agents;
(e) separating the product;
(f) drying the product; and
(g) performing steps (c) through (f) two additional times to obtain the sulfonated poly(phthalazinone ether ketone).

In another aspect, this invention provides a method of preparing a sulfonated poly(phthalazinone ether sulfone), comprising the steps of (a) copolymerizing 4,4'-dihalo (or dinitro)-3,3-disulfonate salt of phenyl sulfone, dihalo (or dinitro) phenyl sulfone, and a monomer containing phthalazinone and phenol group, in polar solvents or reaction medium containing mainly polar solvents, in the presence of a catalyst comprising a metallic base (or its salt), to obtain a product;
(b) dehydrating the product at high temperature using azeotropic dehydration agents;
(c) diluting the product with solvents;
(d) coagulating the product using coagulation agents;
(e) separating the product;
(f) drying the product; and
(g) performing steps (c) through (f) two additional times to obtain the sulfonated poly(phthalazinone ether sulfone).

In another aspect, this invention provides a method for generating electricity comprising the steps of:
(a) providing an anode;
(b) providing a cathode;
(c) providing a polymer electrolyte membrane between the anode and the cathode and in communication with the anode and the cathode, the polymer electrolyte membrane comprising the ionomer of Claim 1 in acid form
(d) flowing a fuel to the cathode where the fuel is disassociated to release a proton and an electron;
(e) transporting the proton across the polymer electrolyte membrane to the anode; and
(f) collecting the electron at a collector to generate electricity.

In other aspects, this invention provides a polymer electrolyte membrane comprising the inventive ionomer, a membrane electrode assembly comprising the inventive ionomer, and a fuel cell, particularly a direct methanol fuel cell, comprising the inventive ionomer.

DETAILED DESCRIPTION OF THE INVENTION

Figure 1:
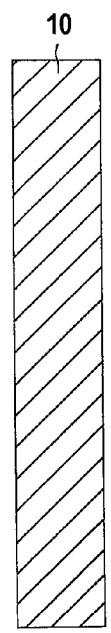
FIG. 1 is a cross-sectional view of a membrane formed from an ionomer according to an exemplary embodiment of the present invention.

The invention starts with a useful molecular structure, which lead to preparation of sulfonated poly(phthalazinone ether ketone)s in one preferred embodiment. In this embodiment, the invention utilizes sulfonated benzophenone and a monomer 4-(4-hydroxyphenyl) phthalazinone, which leads to introduction of phthalazinone structure into the polymer. Without being limited by theory, the pPhthalazinone group is believed to have better high-temperature anti-oxidation properties than the bisphenol-A materials of prior art; also, the electron rich conjugated hetero-cyclic nitrogen groups form hydrogen-bonding with sulfonic acid group, which increases crosslinking density of membrane materials, thus reducing swelling in water, which results in improvement of overall combined properties for PEMFC applications.

More specifically, this embodiment of the invention utilizes monomers of sulfonated dihalo (or dinitro) benzophenone, dihalo (or dinitro) benzophenone, and a monomer containing phthalazinone and phenol group to prepare copolymers of the novel sulfonated poly(phthalazinone ether ketone)s, characterized in the following structure:

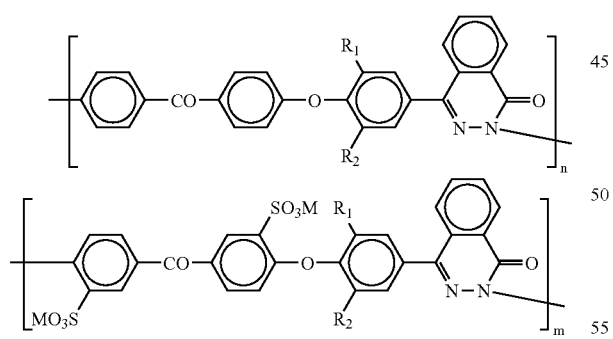

wherein $R_1$ and $R_2$ are selected from hydrogen atom, alkyl group, or aromatic group; M is metallic base ion. The benzophenones used in this embodiment of the invention are 4,4'-dihalo (or dinitro) benzophenones. The sulfonated benzophenones used in this embodiment of the invention are 4,4'-dihalo (or dinitro)-3,3'-disulfonated salt of benzophenones. The monomer containing phthalazinone and phenol group used in this embodiment of the invention has the following molecular structure:

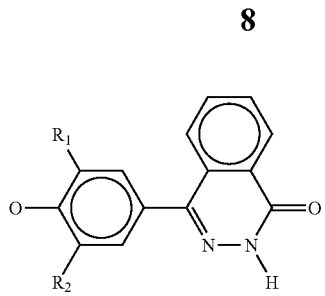

wherein $R_1$ and $R_2$ are selected from hydrogen atom, alkyl group, or aromatic group.

The monomer containing phthalazinone and phenol group may be produced according to methods taught in U.S. Pat. Nos. 5,237,062 and 5,254,663 to Hay. Those patents do not, however, teach or suggest either the use of the phthalazinone monomer in a reaction with sulfonated aromatic compounds, or the use of such products as ionomers or polymer electrolyte membranes in fuel cells.

More broadly, the monomer containing phthalazinone and phenol group useful in the present invention comprises:

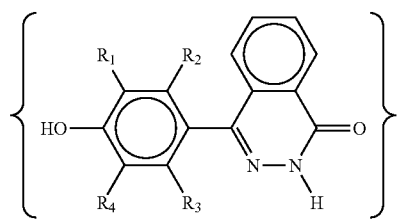

wherein $R_1$, $R_2$, $R_3$ and $R_4$ are independently selected from the group consisting of hydrogen, C1-C4 linear or branch alkyl group, or aromatic group. Examples include, but are not limited to

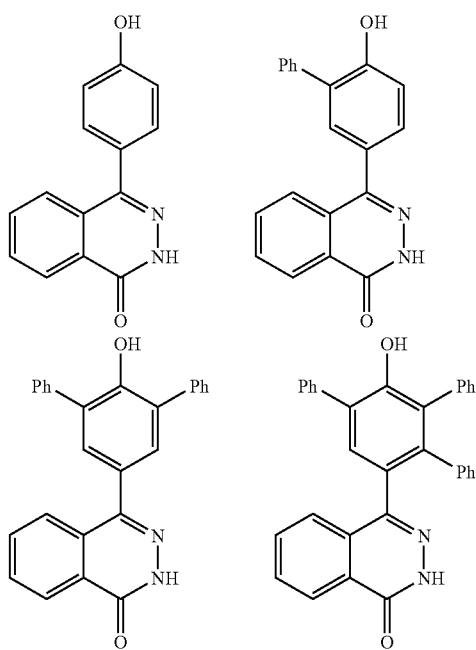

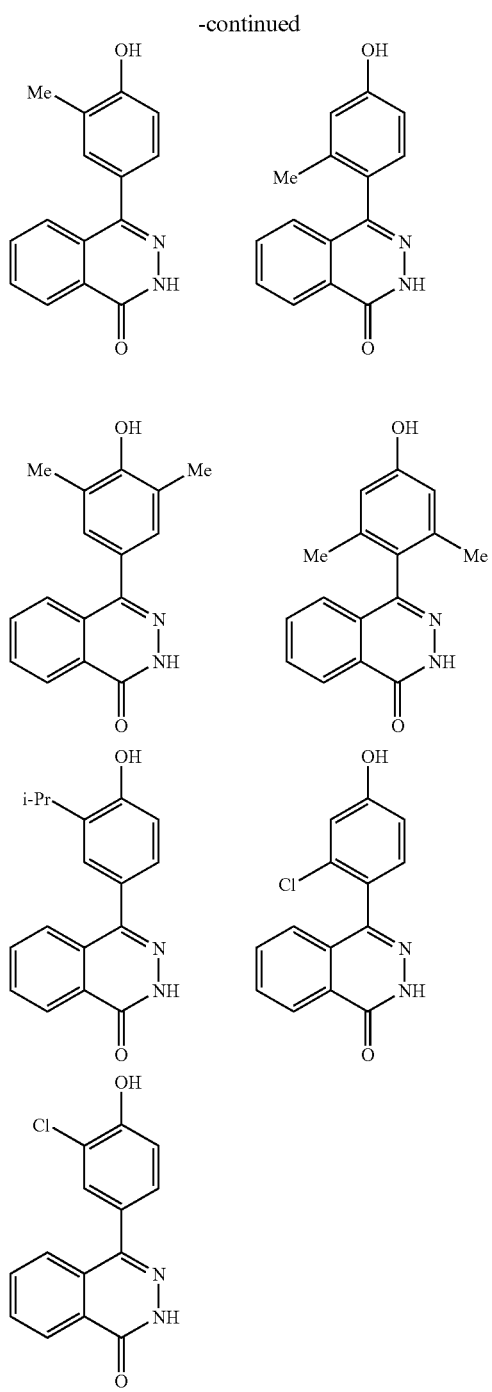

where Me is a CH$_3$ group and Ph is a phenyl group.

The unsulfonated and sulfonated aromatic monomers useful in this invention for reaction with the monomers above comprise compounds of the structure:

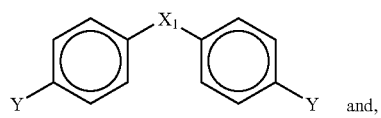 and,

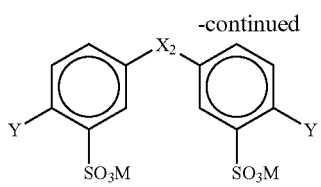

respectively, where X$_1$ and X$_2$ are independently chosen from the group consisting of a ketone; a sulfone; or an aromatic compound connected through a ketone or a sulfone linkage; and Y is a halogen group; and M is an alkali metal. Examples of the unsulfonated aromatic monomer include, but are not limited to,

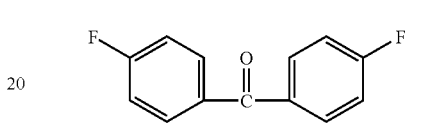

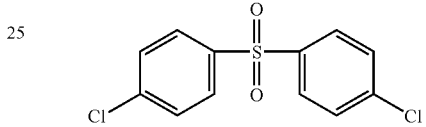

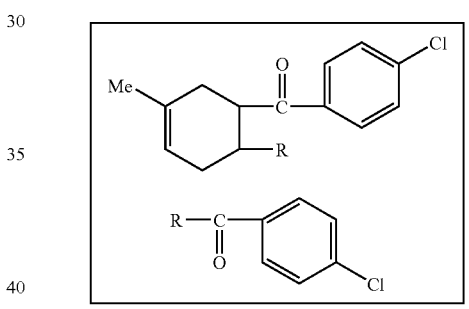

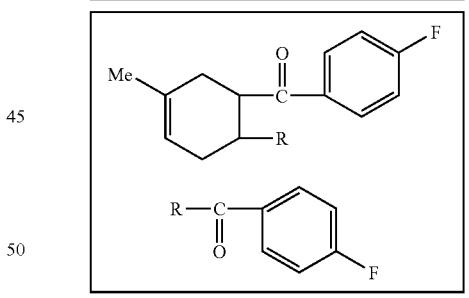

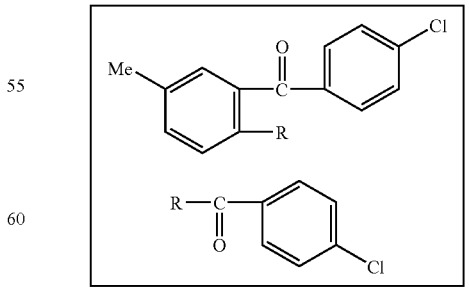

where in these latter three (the three in boxes) the bottom and top compounds are connected at the —R linkage, i.e., the C=O directly connects the two rings, and Me is CH$_3$;

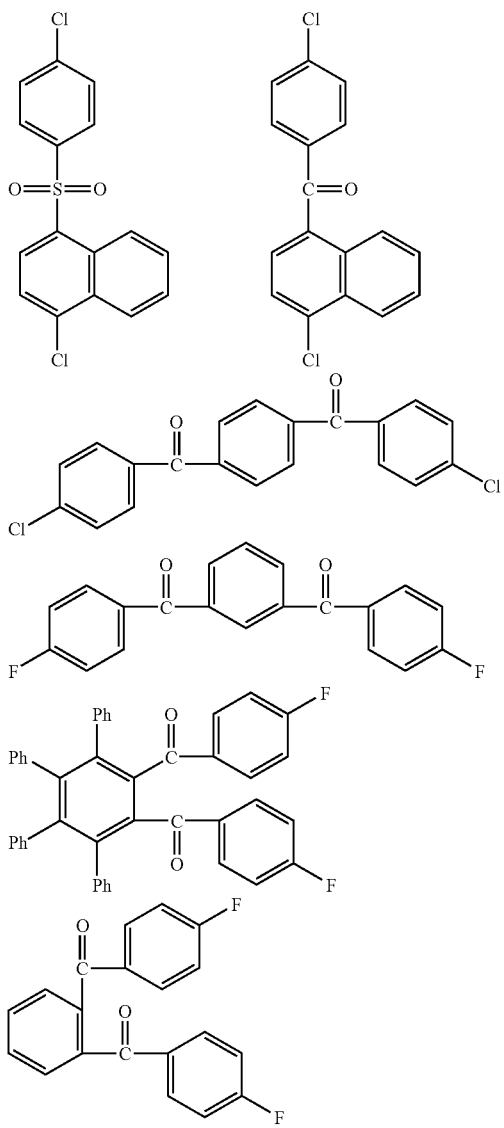

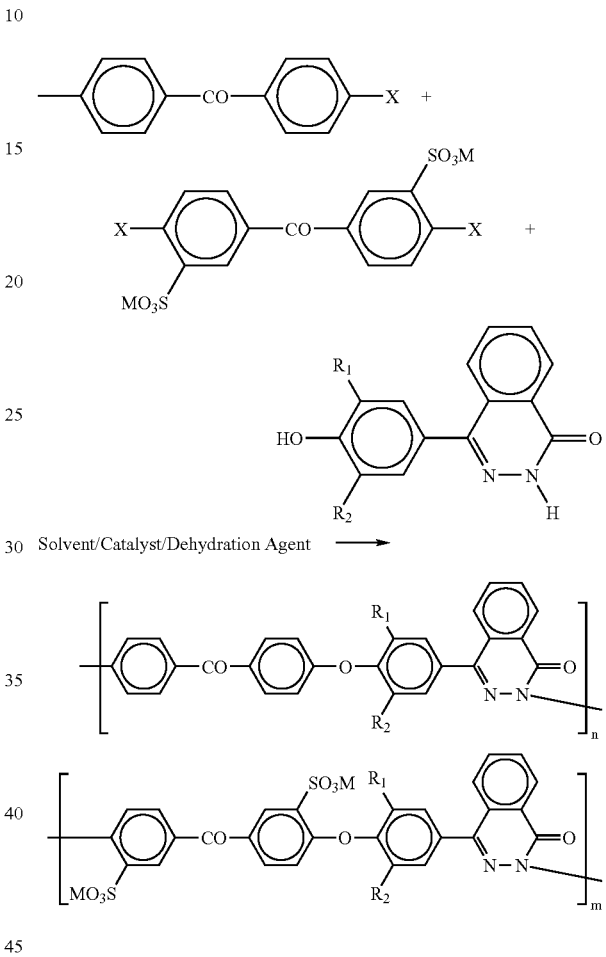

where Ph is a phenyl group. Examples of the sulfonated aromatic compounds can be any of those shown above with an $SO_3M$ group adjacent to each halogen in the structure, where M is an alkali metal. The amount of the unsulfonated aromatic compound can be varied to change the EW of the final product during the reaction, and can range from 0 to about 95%. Overall, the combined number of moles of the unsulfonated and sulfonated aromatic compounds should be equal to the number of moles of the monomer containing phthalazinone and phenol group. It should be noted that the inventors intend this invention to encompass any ionomer formed by polymerizing a monomer containing phthalazinone and phenol group with any ionomer-contributing monomer. The ionomer-contributing monomer preferably comprises sulfonic acid or carboxylic acid.

In the reaction, the monomers are mixed with an azeotroping solvent and an inert aprotic polar solvent containing at least 2 moles of an alkali metal base for each mole of the monomer containing phthalazinone and phenol group, and the reaction is driven to completion by the azeotropic removal of water at a temperature above the azeotropic boiling point of the azeotroping solvent in the presence of water. The alkali metal base is preferably an alkali metal hydroxide or an alkali metal carbonate.

This invention utilizes polymerization reaction temperature between 150-200° C., reaction time 4-32 hours. The polymerization reaction can be characterized by the following equation:

wherein $R_1$ and $R_2$ are selected from hydrogen atom, alkyl group, or aromatic group M is metallic base ion. It will be understood by those skilled in the art that the resulting structure shown above is representative of the reaction product, but should not be construed to be limiting. The product may have random, alternating or blocks of any of the reactant monomers in any arrangement in the final product.

In one embodiment, the invention comprises the following polymerization procedures: equal molar ratio of (sulfonated benzophenone and benzophenone) to the monomer containing phthalazinone and phenol group, metallic bases or excess 100% of metallic base salts, certain amount of toluene (xylene or chloroform), certain amount of polar solvents, such as dimethyl sulfoxide, tetramethylene sulfone, phenyl sulfone, 1-methyl-2-pyrrolidinone, and N,N-dimethylformamide, were charged to a 3-necked bottle. The bottle is equipped with nitrogen gas supply, cooling condenser, and mechanical agitator. Under the protection of nitrogen blanket, the reaction medium was heated to dehydration. The water was removed by azeotropic boiling with azeotropic dehydration agents, heating temperature up to 150-220° C., with 4-32 hours of polymerization time. After natural cooling, the desired reaction product was isolated by repeating the following purification procedure three times: dilution with some solvents, coagulated, filtered, and dried. The desired products were characterized by measuring their viscosity and other physical properties.

This invention prepares polymers confirmed by infrared (IR) spectrum and neutron magnetic resonance (NMR) spectrum. Through adjustment of sulfonated monomer ratio, reaction temperature and reaction time, several different desired products can be made with various sulfonated content and different viscosity.

This invention prepares high molecular weight of novel sulfonated poly(phthalazinone ether ketone) s, having good properties, suitable for PEMFC applications. The membrane materials of this invention are superior to those based on other poly(aromatic ether ketone) s of prior art, in terms of resistance to high temperature oxidation properties, and they have low swelling in water. This material can be processed into films by dissolution in N,N-dimethylformamide, followed by casting and drying of the wet film. The dried film has very good mechanical properties. The good mechanical properties are characterized by the reference teaching in U.S. Pat. No. 4,320,224. A 0.2-millimeter thick film, made by solvent casting and drying, can be folded at least five times with 180° folding angle. If the folded film has no breaking character, the resin is considered having good mechanical properties. Our invented resin has such good mechanical properties. This invention could conveniently adjust the sulfonated monomer ratio to change the sulfonated content in the products, which could adjust electronic conductivity and other properties of the products.

In addition to the use of poly(pthalazinone ether ketone) s described above, an alternative embodiment of the present invention produces poly(pthalazinone ether sulfone) s containing the monomer containing the phthalazinone and phenol group. In this embodiment, the phenyl sulfones used are 4,4'-difluoro (chloro, bromo, or dinitro) phenyl sulfones. The sulfonated phenyl are 4,4'-difluoro (chloro, bromo, or dinitro)-3,3'-disulfonated salt of phenyl sulfones. The monomer containing phthalazinone and phenol group has the following molecular structure:

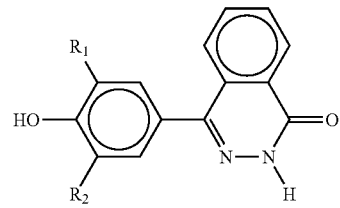

wherein $R_1$ and $R_2$ are selected from hydrogen atom, C1-C4 linear or branch alkyl group, or aromatic group.

In this embodiment the invention utilizes polymerization reaction temperatures between 140-220° C., reaction time 1-36 hours. It utilizes solvents for polymerization medium, which includes polar solvents such as dimethyl sulfoxide, tetramethylene sulfone, phenyl sulfone, 1-methyl-2-pyrrolidinone, N,N-dimethylformamide; and uses water and methanol (or ethanol) as coagulation agents.

This embodiment has the following polymerization procedures: Equal molar ratio of (sulfonated phenyl sulfone and phenyl sulfone) to a monomer containing phthalazinone and phenol group, certain amount of metallic base or metallic base salts, toluene (xylene or chloroform), and solvents were charged to a 3-necked bottle. Under the protection of nitrogen blanket, the reaction medium was heated to dehydration. The dehydrated water was removed by azeotropic boiling with azeotropic dehydration agents, heating temperature up to 140-220° C., with 1-36 hours of polymerization time. After natural cooling, the desired reaction product was isolated by repeating the following purification procedure three times: dilution with some solvents, coagulated, filtered, and dried. The desired products can be characterized by measuring their physical chemical properties.

This embodiment can be shown by the following polymerization equation:

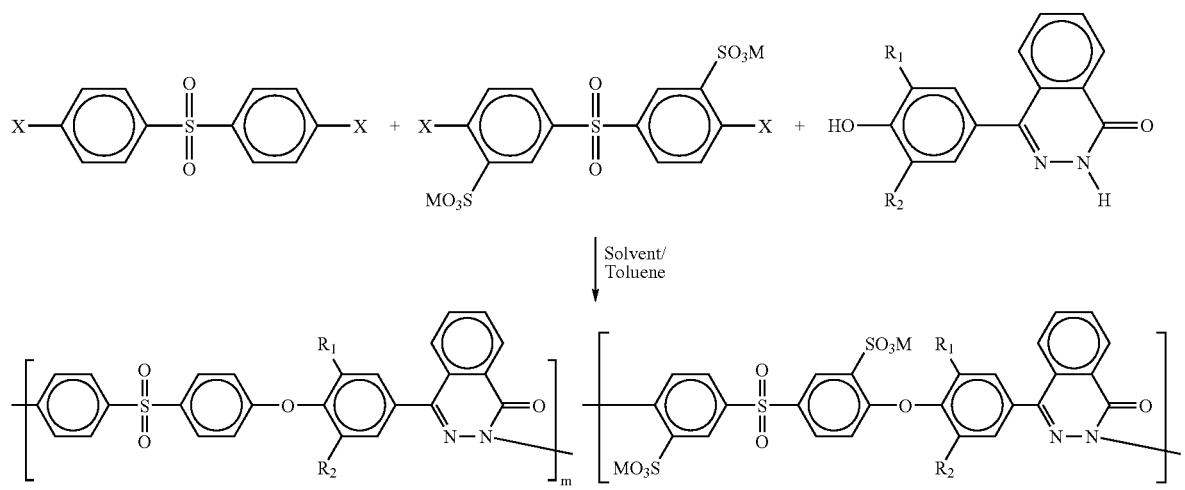

wherein $R_1$ and $R_2$ are selected from hydrogen atom, C1-C4 linear or branch alkyl group, or aromatic group, M is sodium or potassium ion, X is fluorine, chlorine, bromine, or nitro —$NO_2$ group and m+n.> or =20. It will be understood by those skilled in the art that the resulting structure shown above is representative of the reaction product, but should not be construed to be limiting. The product may have random, alternating or blocks of any of the reactant monomers in any arrangement in the final product.

The inventive so-prepared polymers are confirmed by infrared (IR) spectrum and neutron magnetic resonance (NMR) spectrum. Through adjustment of sulfonated monomer ratio, reaction temperature and reaction time, several different desired products can be made with various sulfonated content and different viscosity. It results in adjustment of electronic conductivity and other properties. This invention prepares high molecular weight of novel sulfonated poly(phthalazinone ether sulfone) s, which is a novel ion exchange membrane material. The membrane materials of this invention are superior to those based on other poly(aromatic ether sulfone) s of prior art, in terms of low swelling in water and resistance to high temperature oxidation properties. This material can be processed into films by dissolution in N,N-dimethylformamide, followed by drying the wet film. The dried film has very good mechanical tensile strength and other properties.

As disclosed herein, the reaction product of combining a monomer comprising phthalazinone and phenol groups with at least one monomer of a sulfonated aromatic compounds imparts surprising and desirable properties to the resulting product, particularly for use in polymer electrolyte fuel cells. One well skilled in the art will recognize that a wide range of sulfonated aromatic compounds can be used with said phthalazinone monomer to produce desirable products. Comonomers of the unsulfonated versions of these sulfonated monomers may also be present in the reaction. Reactions conditions such as reaction temperatures, dehydration agents and coagulation agents may vary depending on the particular sulfonated aromatic compound, but are readily determined by one skilled in the art from the known properties of the monomer or its unsulfonated cousin.

The polymers disclosed herein can be formed into a membrane 10 (as shown in the exemplary embodiment depicted in FIG. 1) using methods well known in the art, including solution casting or dry pressing. The ease with which the polymer dissolves in aprotic dipolar organic solvents such as DMSO makes solution casting the preferable method.

One important parameter used to characterize ionomers is the equivalent weight. Within this application, the equivalent weight (EW) is defined to be the weight of the polymer in acid form required to neutralize one equivalent of NaOH. Higher EW means that there are fewer active ionic species (e.g., protons) present. If it takes more of the polymer to neutralize one equivalent of hydroxyl ions there must be fewer active ionic species within the polymer. Because the ionic conductivity is generally proportional to the number of active ionic species in the polymer, one would therefore like to lower the EW in order to increase conductivity. The polymers disclosed herein can be prepared with a range of EWs between about 300 and greater than 4000, with preferable EW in the range of 400 to 1500. As is well known in the art, by varying the concentration of the reactants, different equivalent weight products can be formed. For example, in the exemplary embodiment where the sPPEK polymer is produced, Table 1 shows the concentrations of 4,4'-dihalo (or dinitro)-3,3'-disulfonate salt of benzophenone [Monomer 2 in Table 1] and dihalo (or dinitro) phenyl benzophenone [Monomer 1 in Table 1] one would use to produce various EW polymers using the procedures disclosed herein. In Table 1 a fixed concentration of phthalazinone monomer of 10 moles would be used.

TABLE 1*

| Monomer 1 Moles | Monomer 2 Moles | EW g/eq | IEC meq/g |
|---|---|---|---|
| 0.0 | 10.0 | 288 | 3.472 |
| 0.5 | 9.5 | 299 | 3.345 |
| 1.0 | 9.0 | 311 | 3.214 |
| 1.5 | 8.5 | 325 | 3.080 |
| 2.0 | 8.0 | 340 | 2.941 |
| 2.5 | 7.5 | 357 | 2.799 |
| 3.0 | 7.0 | 377 | 2.652 |
| 3.5 | 6.5 | 400 | 2.500 |
| 4.0 | 6.0 | 427 | 2.344 |
| 4.5 | 5.5 | 458 | 2.183 |
| 5.0 | 5.0 | 496 | 2.016 |
| 5.5 | 4.5 | 542 | 1.844 |
| 6.0 | 4.0 | 600 | 1.667 |
| 6.5 | 3.5 | 674 | 1.483 |
| 7.0 | 3.0 | 773 | 1.293 |
| 7.5 | 2.5 | 912 | 1.096 |
| 8.0 | 2.0 | 1120 | 0.893 |
| 8.5 | 1.5 | 1467 | 0.682 |
| 9.0 | 1.0 | 2160 | 0.463 |
| 9.5 | 0.5 | 4240 | 0.236 |

*Fixed concentration of phthalazinone monomer of 10 Moles

Figure 2:
FIG. 2 is a cross-sectional view of a composite membrane formed using an ionomer according to an exemplary embodiment of the present invention.

It has also been discovered by the inventors that the inventive polymers disclosed herein can be incorporated into various components of fuel cells to form highly desirable products. For example, the inventive polymers can be used as the solid polymer electrolytes in hydrogen-air or in a direct methanol fuel cell. Furthermore, they can be incorporated into a porous polymer substrate material to form thin, strong membranes as shown in the exemplary embodiment of FIG. 2, where substrate 20 and ionomer 21 form a composite membrane 22. Substrates 20 can include, but are not limited to porous polyolefins, including polyethylene, polypropylene and polytetrafluoroethylene. Polytetrafluoroethylene is a particularly desirable porous substrate because of its chemical inertness and high melting temperature. Various methods of forming porous polytetrafluoroethylene are known in the art. One particularly preferable porous polymer substrate is expanded polytetrafluoroethylene as described in U.S. Pat. No. 3,953,566, incorporated by reference herein in its entirety. Using the methods disclosed by Bahar et. al. in U.S. Patent RE 37,707, RE 37,756 and RE 37,701, all incorporated by reference in their entirety, a composite solid polymer electrolyte with highly desirable properties can be formed.

Additionally, the incorporation of the inventive ionomer within the anode and cathode electrode structures is desirable. It offers the potential for improved cell performance, both in power density and methanol crossover barrier characteristics (with concomitant improvement in voltage and fuel efficiencies) in direct methanol fuel cells.

Fuel cell electrodes comprising the inventive polymers could be inking based, typically prepared by mixing appropriate amounts of the ionomer with catalyst and solvents, producing a slurry or ink. This ink can then be applied directly onto a membrane or onto decal substrates that can transfer the catalyst layer onto the membrane via standard hot pressing techniques.

Fuel cell electrodes containing the above ionomer can also be prepared using PTFE-bonded catalyzed gas diffusion electrode (GDE) architectures, in which the methanol transport resistant ionomer is used to impregnate (using brushing, casting, spraying, etc.) the PTFE-catalyst structure. Anodes and cathodes prepared using this ionomer are expected to improve the methanol crossover barrier characteristics of the MEA as well as the electrodic performance of the cell (when compared to NAFION® impregnated electrodes).

Additionally, methanol tolerant/insensitive cathodes can also be prepared with the ionomers. Such electrodes can increase the cell performance and voltage efficiency in a DMFC cell as the crossed-over methanol would not adversely affect the oxygen reduction activity of the air electrode. The high methanol permeation resistance of this polymer makes it suitable and advantageous for its selective incorporation as electrode ionomer for DMFC cathode thus yielding an air electrode with methanol tolerant/insensitive characteristics. When the ionomers used in this patent are present in high enough ionomer/metal ratios to effectively block/cover the Pt catalyst, then it is expected that the cathode cell will exhibit large methanol insensitivity due to the high methanol permeation resistance of this polymer.

Methanol tolerant/insensitive cathodes can be prepared by pre-treating the electrocatalyst prior to electrode/ink making with a solution of the above polymer. The pre-treatment could consist of effective mixing and contacting of the ionomer solution and the catalyst phases and posterior evaporation of the solvent, thus resulting in a Pt catalyst phase effectively covered with a "skin" of the methanol permeation resistant ionomer. This pre-treated catalyst can be used to make cathode electrodes of diverse architectures using methods known in the art, including inking, gas diffusion electrodes, etc.

Another approach to prepare methanol tolerant/insensitive cathodes would consist on preparing an ink with the above ionomer, solvent and catalyst but using high ionomer/metal ratio. The resulting dry-ink electrode would have the Pt phase effectively "blocked" by the methanol permeation resistant ionomer.

Finally a methanol tolerant/insensitive cathodes with PTFE-bonded catalyzed GDE architecture can be prepared by dipping the GDE into a solution of the above ionomer. The ionomer will then totally impregnate and saturate the structure thus totally and effectively covering the Pt phase.

Figure 3:
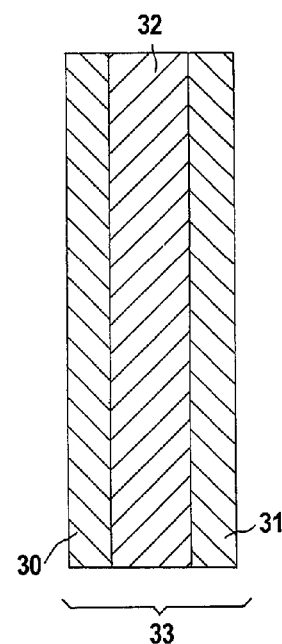
FIG. 3 is a cross-sectional view of a membrane electrode assembly formed using a solid polymer electrolyte according to an exemplary embodiment of the present invention.
Figure 4:
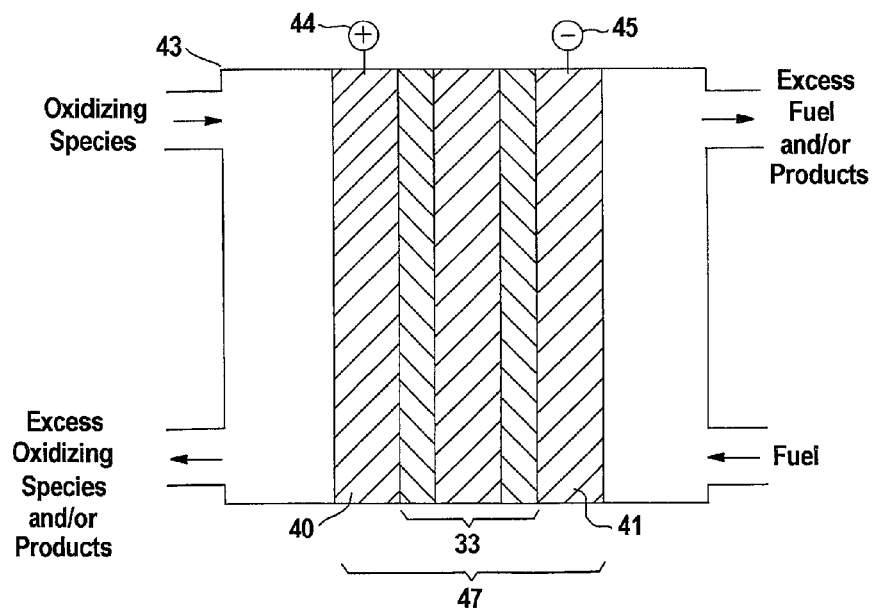
FIG. 4 is a cross-sectional view of a fuel cell including a solid polymer electrolyte according to an exemplary embodiment of the present invention.

The inventive polymers can be formed into membrane electrode assembly using various approaches known in the art, as shown in the exemplary embodiment of FIG. 3 where the membrane electrode assembly 33 is formed from an electrolyte separator 32 and two electrodes 30 and 31. The inventive polymer can be incorporated into one or more electrodes comprising the inventive polymers; and/or the electrolyte separator comprising the inventive polymers. One or more of the preceding MEAs can be assembled into an operating fuel cell 43 as shown in the exemplary embodiment of FIG. 4, where the MEA 33 is assembled with two gas diffusion media 40 and 41 one or more of which may also comprise inventive polymers. In order to generate electricity, the fuel cell is connected to an external load through leads 44 and 45. As is well known in the art, multiple MEAs can also be assembled into a fuel cell stack by separating multiple MEAs with attached gas diffusion media 47 with bipolar plates. The resulting fuel cell can be used with a variety of fuels and oxidizing atmospheres to generate electricity. Fuels may include hydrogen; alcohols, including methanol or ethanol; or other hydrocarbon fluids. Oxidizing atmospheres can include oxygen, air, hydrogen peroxide, or other fluids that are oxidizing with respect to hydrogen. Finally, the inventive ionomers can comprise the electrolyte separator in an electrolysis cell where electricity is used to form products.

The following procedures were used to characterize the ionomers prepared according the above description.

Equivalent Weight

Ion-exchange capacity is measured herein by determining the equivalent weight as follows: A dry weight of 0.5-1.0 g of the polymer membrane in the $SO_3H$ form is dipped in 50 ml of saturated NaCl solution. The resulting acid solution containing the polymer membrane is titrated with 0.1 N NaOH solution. The equivalent weight is determined from the ion exchange capacity according to $$EW(g/\text{Equivalent}) = 1000/IEC$$

where $$IEC\,(\text{meq/g}) = \frac{[\text{ml NaOH} \times 0.1\,N]}{\text{Dried Ionomer Solid Weight}\,(g)}$$

Room Temperature Resistance

Figure 5:
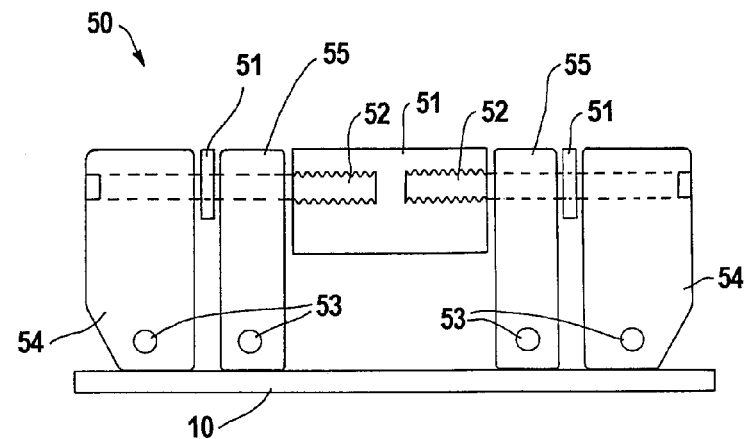
FIG. 5 is a schematic of a room temperature conductivity fixture.

A membrane sample about 2 inches by about 3 inches in size was first equilibrated at room conditions of 21 degrees C., 55% RH for 24 hrs. It was then immersed into a plastic beaker containing room temperature deionized water. Two measurements were taken over a 2 hours time period: the first one after 30 minutes and the second one at 2 hours. To take the measurements the membrane sample was taken out of the water and patted dry by paper tissues. The thickness was then measured immediately using an MT60M Heidenhain (Schaumburg, Ill.) thickness gauge attached to a Heidenhain ND281B digital display. The gauge was mounted vertically over a flat plate, and measurements were made at eight different locations on the sample, covering the corners and center of the sample. The spring-loaded probe of the gauge was lowered gently on the film for each measurement to minimize compression. The mean of the eight values was used as the sample thickness. The ionic resistance of the membrane 10 was then measured using a four-point probe conductivity cell shown in FIG. 5. The sensing probes 55 of conductivity cell 50 are approximately one inch long, and approximately one inch apart. A plexiglass spacer 51 provides insulation between the current probes 54 and sensing probes 55. The cell is held together with nylon screws 52 and electrical contact is made to the probes through holes 53. During the measurement, a 900 g weight (not shown) was loaded onto the cell to ensure good contact. It was found that the resistance value is independent of further pressure onto conductivity cell 50. The resistance was measured by connecting leads (not shown) through holes 53 using 10 mV AC amplitude at 1000 Hz frequency applied by a Solartron SI 1280B controlled by ZPlot software written by Scribner Associates. Measurements were taken in the potentiostatic mode. Under these conditions, the phase angle was found to be insignificant throughout the measurement. The room temperature ionic conductivity in S/cm for each measurement was calculated from the formula $$\sigma = \frac{L_2}{R * L_1 * D}$$

Where $\sigma$ is the room temperature ionic conductivity, $L_2$ is distance between the sensing probes, here equal to 2.5654 cm, $L_1$ is the length of the sensing probe, here 2.5603 cm, D is the measured thickness of the membrane in cm, and R is the measured resistance in ohms. The membrane ionic resistance, in ohm-cm² , is calculated from the conductivity from the formula:

$$\rho = \frac{D}{\sigma}$$

The results showed that the room temperature ionic conductivity was independent of the soaking time between 30 minutes and 2 hours for all the samples tested. The reported value is the average calculated from the two measurements.

Methanol Transport Resistance

A methanol permeation apparatus was used to evaluate the methanol transport resistance characteristics of the solid polymer electrolytes.

Membrane samples to be tested were soaked in DI water for a minimum of 10 minutes prior to testing. The soaking step allowed the membranes to equilibrate in water and to pre-swell before being assembled in the testing fixture. A 5-cm×7-cm membrane piece was then cut to fit the testing fixture, shown schematically in FIG. 6. The membrane sample 61 was mounted between two pre-cut 1-mil polyethylenenapthalene (PEN) gaskets 62. The gaskets were cut in order to leave an opened window of 3-cm×3.5-cm corresponding to a testing area of 10.5 cm². The wet membrane thickness of the testing area was immediately measured with a Mitutoyo snap gauge (Model # 7301). Measurements were made at six different locations and the mean of the six values was used as the sample wet thickness.

The membrane-gasket assembly was then placed into the testing fixture 67 with the opened window towards the outlet end of the cell. A 2M methanol feed solution was introduced into the testing fixture in inlet channel 63 at a flow rate of 5 ml/min while DI water was introduced into the testing fixture in inlet channel 65 at a flow rate of 5 ml/min. The testing fixture was tilted a few times to assure that no air bubbles were trapped into the flow channels and was then placed tilted, outlet end up, in a water bath set at 60 degrees C. Both the methanol feed solution and the water flush were fed through the testing fixture for a minimum of an hour to allow equilibration and to reach a steady state permeation rate of methanol through the tested samples. During this 1 hour of equilibration time, the methanol solution exited the testing fixture through outlet channel 64 while the water flush exited the testing fixture through outlet channel 66. Both methanol and water effluents were discarded during the equilibration time.

After one hour, the water effluent or water permeate 66 was then sampled 4 times at intervals of 5 minutes. Each sample was collected into a 5 ml vial and analyzed for methanol concentration by a Perkin Elmer Auto System XL gas chromatograph.

Four standards were prepared: 80, 800, 4000 and 8000 PPM of methanol in water. All standards were sampled twice by the gas chromatograph (GC) to obtain a calibration curve of methanol peak area versus PPM of methanol. Each water permeate sample was also sampled twice and the measured methanol peak area was converted into PPM of methanol by using the calibration curve. The methanol feed concentration was also verified by GC after dilution 40-fold.

The total methanol permeability was calculated according to:

$$P_{total}(cm^2/sec) = \frac{(C_{perm} * V_{perm})}{A} * \frac{t}{(C_{feed} - C_{perm})}$$

where:
$C_{perm}$=concentration of the permeate water (convert PPM from GC to mol/cm³)
$C_{feed}$=concentration of the methanol feed (mol/cm³)
$V_{perm}$=water flow rate (cm³/sec)
t=wet thickness (cm)
A=testing area (cm²).

A total resistance was then calculated according to:

$R_{total}(sec/cm)=t/P_{total}$

The sample methanol transport resistance was then calculated by subtracting the testing fixture resistance from the total resistance, i.e., $R_{sample}=R_{total}-R_{cell}.$ The testing fixture was designed to minimize noise, to assure proper flows and constant concentration over the testing area; however, part of the methanol transport resistance could be attributed to the testing fixture contribution and needed to be subtracted from the total resistance measured. The testing fixture resistance, $R_{cell}$, was determined from testing NAFION® perfluorosulfonic acid membranes (1100 EW) of three different thicknesses. The total resistance for these three samples was plotted against membrane thickness and the fixture resistance was extrapolated from the intercept of the linear curve fit of the data with the y-axis (for a zero thickness).

Relative Selectivity Factor

As described above, there are two different important characteristics of membranes for solid polymer electrolytes in direct methanol fuel cells: ionic resistance and resistance to methanol transport. In order to assess the combination of these two, a Relative Selectivity Factor (RSF) is defined as follows:

$$RSF = \frac{\left(\frac{\overline{\rho}^{NAFION117}}{\overline{R}_{total}^{NAFION117}}\right)}{\left(\frac{\overline{\rho}^{test}}{\overline{R}_{total}^{test}}\right)}$$

where
$\overline{\rho}^{NAFION117}$ and $\overline{\rho}^{test}$ are the ionic resistances of NAFION® 117, and the test sample, respectively, averaged over at least three and at least two samples, respectively;
$\overline{R}_{total}^{NAFION117}$ and $\overline{R}_{total}^{test}$ are the methanol transport resistances of NAFION® 117 test sample, respectively, averaged over at least three and at least two samples, respectively.

Figure 10:
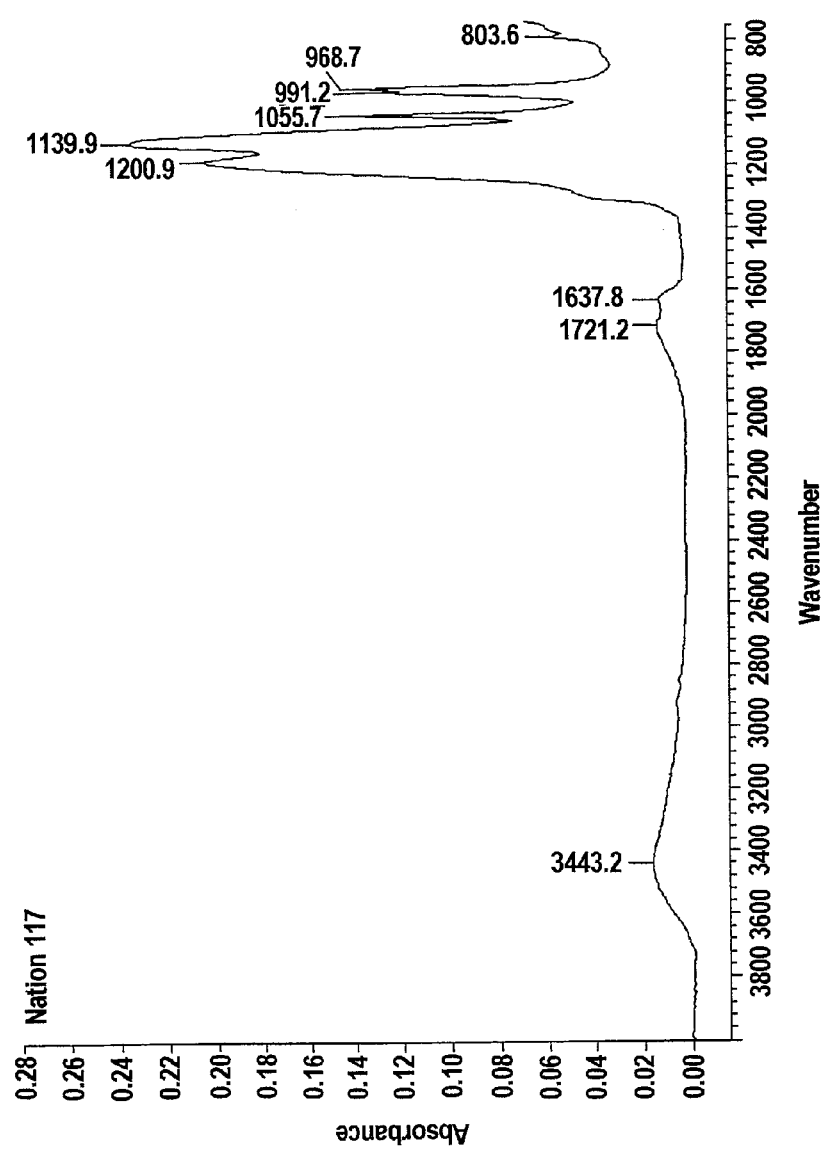
FIG. 10 is an infrared spectrum of the NAFION® 117 solid polymer electrolyte membrane used in the Relative Selectivity Factor measurement.

The NAFION® 117 material used as the reference herein was characterized using an IR measurement performed using a DigiLab FTS 4000 Excaliber in horizontal attenuated total reflectance (HATR) mode with a ZnSe crystal. The measurement used a resolution of 4 and 20 scans were co-added. The results of this measurement are shown in FIG. 10.

The RSF for the standard NAFION® 117 membrane is, by arbitrary definition, equal to one. Materials that have a lower ratio of ionic resistance to methanol transport resistance than the NAFION® 117 membrane should be superior materials for direct methanol fuel cells. Such materials will thus have a RSF greater than one.

Electrochemical Methanol Crossover Measurement

This measurement was performed in a direct methanol fuel cell (DMFC) cell by evaluating the electrochemical limiting current originated by electrooxidation of the methanol flux as described in X. Ren, T. Zawodzinski Jr., F. Uribe, H. Dai and S. Gottesfeld *Electrochem. Soc. Proc. Vol* 95-23 p. 284 *First Intl. Symp. on Proton Conducting Membrane Fuel Cells I* The Electrochemical Society (1995).

Briefly, the same MEA used for DMFC polarization performance is used for electrochemical crossover. The air electrode or cathode is converted to a $N_2$ electrode. The anode is unchanged flowing methanol solution. An external power supply or potentiostat is then used in bipolar mode (working electrode=$N_2$ electrode, counter/reference electrodes=methanol (fuel) electrode) to externally bias the cell. The electrooxidation of crossed-over methanol occurs in the $N_2$ electrode (working electrode) following the following redox reaction:

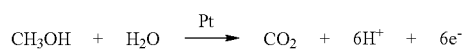

and the electroreduction of the proton flux to $H_2$:

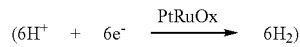

takes place in the methanol electrode (counter/reference). The steady-state methanol electrooxidation current is then measured versus imposed cell potential (typically 0 to 1V): it increases with cell potential and will typically reach a limiting value or plateau. This limiting current is then a measure of the methanol crossover rate, and its flux can be calculated from the following relationship:

$$F_{crossover} = \frac{i_{lim} * 1000}{6F},$$

where $i_{lim}$ is the measured limiting current density in mA/cm$^2$, F is the Faraday's constant, equal to 96487 A-s/mol and $F_{crossover}$ is in micromol/cm$^2$-s.

Specifically, the electrochemical methanol crossover measurement was performed on the cell using an externally biased Amel Instruments 2055 High Power Galvanostat/Potentiostat in conjunction with and Amel Programmable Function Generator (Model 568). The cell remained connected to the same Globetech gas unit used for fuel cell polarization experiments described below in Characterization of Examples And Comparative Examples. The procedure for this test was as follows: the cell was potentiostatically biased in bipolar mode (working electrode=$N_2$ electrode, counter/reference electrodes=methanol electrode) with cell potential (working versus reference) spanning 0→900 mV, slowly scanning at 2 mV/sec. The slow scan rate was used to assure a steady-state current measurement. The cell was held at 60 degrees C. with anode flowing 2.5 ml/min of 1.0 M $CH_3OH$ solution and cathode flowing 50 sccm of $N_2$ saturated at 65 degrees C. The heat trace lines to the cell were held at 75/70 degrees C. for anode and cathode, respectively. At least three scans were conducted to average a characteristic methanol crossover limiting current, each scan conducted ca. 15 minutes apart to guarantee stabilization of the cell prior every measurement. The methanol crossover was calculated as described above.

The following examples are intended to demonstrate but not to limit the inventive ionomers and methods of making them. Unless otherwise specifically mentioned, the source of compounds used in the examples is as follows: 4,4'-Difluorobenzophenone was purchased from Aldrich Chemical Co. and used without further purification. 4-(4-Hydroxyphenyl) phthalazinone (supplied by Dalian University of Technology) was used as received. 5,5'-Carbonylbis(2-fluoro-benzene sulfonate) was synthesized by sulfonation of 4,4'-difluorobenzophenone according to the general procedure reported by Wang [F. Wang, T. Chen, J. Xu, *Macromol. Chem. Phys.* 1998,199,1421]. Dimethyl sulfoxide (DMSO) and toluene were purified by distillation and stored over 4A molecular sieves. Other reagents and solvents were obtained commercially and used without further purification.

EXAMPLE 1 sPPEK Polymer Preparation 2.5338 gram (6 milli mole) of disodium 3,3'-sulfonyl(4,4'-difluorobenzophenone), 5.2368 gram (24 milli mole) of 4,4'-difluorobenzophenone, 7.1474 gram (30 milli mole) 4-(4-hydroxyphenyl) phthalazinone and 3.1796 gram (30 milli mole) sodium carbonate, 40 milliliter of toluene, 60 milliliter of dimethyl sulfoxide were charged to a 3-necked bottle, which equipped with nitrogen purge supply, cooling condenser, and mechanical agitator. Under protection of nitrogen blanket, the bottle was heated to 190° C. for 8-hour of polymerization. During the polymerization, water was generated and was removed by azeotropic boiling with toluene. After cooling, the reaction product was diluted with dimethyl sulfoxide, followed by coagulation by 1:1 by weight of ethanol/water mixture. The coagulant was filtered three times, then dried in a vacuum oven at 80° C. The obtained product has a reduced viscosity of 1.08 dl/g, glass transition temperature of 252° C., and thermal weight loss of 10% at 532° C.

EXAMPLE 2 sPPEK Polymer Preparation 5.0675 gram (12 milli mole) of disodium 3,3'-sulfonyl(4,4'-difluorobenzophenone), 3.9276 gram (18 milli mole) of 4,4'-difluorobenzophenone, 7.1474 gram (30 milli mole) 4-(4-hydroxyphenyl) phthalazinone and 3.1796 gram (30 milli mole) sodium carbonate, 40 milliliter of toluene, 60 milliliter of dimethyl sulfoxide were charged to a 3-necked bottle, which equipped with nitrogen purge supply, cooling condenser, and mechanical agitator. Under protection of nitrogen blanket, the bottle was heated to 190° C. for 8-hour of polymerization. During the polymerization, water was generated and was removed by azeotropic boiling with toluene. After cooling, the reaction product was diluted with dimethyl sulfoxide, followed by coagulation by 1:1 by weight of ethanol/water mixture. The coagulant was filtered three times, then dried in a vacuum oven at 80° C. The obtained product has a reduced viscosity of 3.38 dl/g, glass transition temperature of 308° C., and thermal weight loss of 10% at 497° C.

EXAMPLE 3 sPPEK Polymer and Membrane Preparation

An sPPEK solid polymer electrolyte was prepared as follows: In a 150 ml three-necked round flask, equipped with a Dean-Stark trap, a condenser, a nitrogen inlet, 20 mmol 4-(4-Hydroxyphenyl) phthalazinone, a mixture of 5,5'-carbonyl-bis(2-fluorobenzene sulfonate) and 4,4'-difluorobenzophenone (20 mmol), and appropriate amount of alkali were added into a mixture of 40 ml DMSO and 45 ml toluene. The mixture was refluxed for 3 h at 150 C, and then excess toluene was distilled off. The mixture was heated at 175 C for 20 h. Then the reaction mixture was cooled to room temperature and poured into water to precipitate the copolymer. The crude product was then washed six times with hot water to remove inorganic salts. The purified polymer was filtered and dried in vacuo at 100 C for 48 h. The resulting polymer was sPPEK polymer shown above with $R_1$ and $R_2$ equal to hydrogen, and M equal to Na.

A membrane was prepared by casting a 3% solution in DMSO on a glass plate in a dust-free environment. The membranes were dried at 85 C for 10 h and successively dried in a vacuum oven at 100 C for 48 h. The resulting membrane was then ion exchanged to acid form. The EW of the polymer as calculated from the constituents was 621 while that measured experimentally using the procedure described above was 633, which are in agreement within the experimental error. This agreement indicates that the pendant sulfonate groups were successfully attached to the polymer chains.

The Relative Selectivity Factor as described above was calculated for the resulting solid polymer electrolyte membrane. The calculated RSF was 1.28, indicating that the membrane is expected to show improved direct methanol fuel cell performance over the standard NAFION® 117 membrane when used as a solid polymer electrolyte in a direct methanol fuel cell.

EXAMPLE 4 AND COMPARATIVE EXAMPLE A AND B

Preparation of MEAs

In order to assess the inventive solid polymer electrolyte under fuel cell conditions, membrane electrode assemblies (MEAs) were prepared for both the inventive solid polymer electrolyte in acid form of Example 3 and two comparative examples, acid form of NAFION® membrane 117 (Comparative Example A) and acid form of NAFION® membrane 112 (Comparative Example B) available from E. I. Du Pont de Nemours Corporation. The two comparative examples are commercial materials of perfluorosulfonic acid solid polymer electrolytes, where the equivalent weight is 1100. The two materials differ only in thickness, with NAFION® membrane 117 having a nominal thickness of 7 mils or 175 microns (actual thickness, 179 microns as measured using an MT60M Heidenhain (Schaumburg, Ill.) thickness gauge attached to a Heidenhain ND281B digital display), and NAFION® membrane 112 having a nominal thickness of 2 mils or 50 microns (actual thickness 46 microns). The inventive polymer had a measured thickness of 36 microns, when dry, as determined using an MT60M Heidenhain (Schaumburg, Ill.) thickness gauge attached to a Heidenhain ND281B digital display.

To prepare MEAs from the inventive solid polymer electrolyte and the comparative examples, electrodes were prepared first. The same anode and cathode was used for both the inventive solid polymer electrolyte and the comparative examples. Standard commercial electrodes impregnated with NAFION® 1100 EW ionomer solution were used. The procedure for the electrode preparation was as follows. The anode was a commercial gas diffusion electrode (GDE) purchased from E-Tek Inc. The GDE contained 4.0 mg/cm² unsupported PtRuOx (Pt:Ru=1:1) and 10% PTFE in the catalyst layer and was applied onto non-wetproofed carbon paper gas diffusion media (EFCG/TGPH-060). The cathode was a commercial gas diffusion electrode (GDE) purchased from E-Tek Inc. The GDE contained 4.0 mg/cm² Pt black and 20% PTFE in the catalyst layer and was applied onto single sided ELAT gas diffusion media.

The electrodes were die-cut in 5 cm² squares (correspondent to the MEA active surface area) and were individually impregnated with Nafion solution (1100 EW) prior to MEA preparation. The anode and cathode ionomer impregnation levels were selected to be ca. 0.7 mg dry ionomer/cm² and 0.3 mg dry ionomer/cm² for the anode and cathode, respectively, following a ratio of metal catalyst-to-ionomer in the anode and cathode of 5.7 and 13.3. The impregnation ionomer solution was prepared from a master Nafion (1100 EW) solution 22% solids (E. I. Du Pont de Nemours Corporation) which was diluted at a ratio of 1:4 with 50% $C_2H_5OH$—$H_2O$ solution. The diluted Nafion solution was then uniformly brushed on the surface of the GDE, dried using a heat gun, and weighted. This process was repeated until the desired target ionomer loading was achieved. The process typically took 2 to 3 passes to achieve the target ionomer loading.

Using the electrodes so prepared, an MEA was prepared for the inventive solid polymer electrolyte and the two comparatives by standard hot pressing of the ionomer-impregnated GDEs to the electrolyte membrane. Pressing conditions were adjusted to achieve good bonding to the solid polymer electrolyte. The electrode/membrane/electrode elements were placed between two pieces of Kapton tape and hot pressed in a manual press (PHI, model Q230H, with heated platens). For the comparative examples, pressing conditions were 12 tons load, 320° F. (both platens heated) and 3 minutes pressing time. For the inventive example, 12 tons load, 200° F. (both platens heated) and 3 minutes pressing time was used.

EXAMPLE 4A

Fuel Cell Preparation Using Inventive Solid Polymer Electrolyte and Comparative Solid Polymer Electrolytes Fuel cells using the two MEAs having the comparative examples as solid polymer electrolytes, and the one MEA using the inventive solid polymer electrolyte were assembled using the following procedure. The MEA of Example 4 (5 cm² active surface area) was loaded in a standard fuel cell testing fixture (5 cm², single channel serpentine flow field, 8 bolts made by Fuel Cell Technologies, Alburquerque N. Mex.). The bolts were lubricated with Krytox lube (Du Pont) prior to assembly. The MEA was assembled using commercial 7 mils silicon-impregnated glass cloth (Tate Engineering, Aston, Mich.) gasket for the anode and 10 mils gasket for the cathode. All gaskets had a 5 cm² window and covered the entire graphite plate of the fuel cell fixture and membrane border of the MEA, typically 3 in×3 in. The assembly was conducted without alignment pins in order to avoid gas leakage between plates. No additional gas diffusion media was added. Upon alignment of the elements and assembly the fixture was then torqued down to 45 lb-in/bolt compression following 5 lb-in increments in a star configuration for the 8 bolts. A torque-wrench (with maximum torque of 75 lb-in)

was used to torque the cell to the desired load. Finally the cell was also checked for electrical shorts between the current collector and compression plates prior to applying load at the fuel cell station.

EXAMPLE 5

Electrode Containing Inventive Ionomer

Prototype DMFC anode and cathodes were prepared using the same commercial base (ionomer-free) electrodes and same ionomer impregnation strategies used for the "screening"-Nafion based gas diffusion electrodes (GDEs) described in Example 4.

A 3% solids dimethyl sulfoxide solution using the solid polymer electrolyte membrane of Example 3 was prepared. An ionomer solution of the polymer was produced by dissolving a membrane in appropriate solvents. Dimethyl sulfoxide (DMSO) was found to be a good solvent for solution preparation. The ionomer membrane of Example 3 was first ion exchanged to the sodium form by neutralization with a 0.5N sodium hydroxide solution. The membrane was allowed to dry at room temperature for a minimum of 4 hours. 8.9 g of methyl sulfoxide was poured into a flask. The solvent was agitated by a magnetic stirrer and the flask was kept under dry nitrogen. 0.3 g of membrane was then added to the flask to prepare a 3% solids solution in DMSO. The content of the flask was heated to 90 degrees C. for about 30 minutes for complete dissolution of the membrane. The resulting ionomer solution, contained 3% solids.

This solution was then used to impregnate the 5 cm$^2$ GDEs resulting in prototype anodes and cathodes. The resulting anode GDE consisted of unsupported 4.0 mg/cm$^2$ PtRuOx metal catalyst loading impregnated at a level of ca. 0.7 mg/cm$^2$ dry ionomer. The prototype cathode GDE consisted of unsupported 4.0 mg/cm$^2$ Pt black metal catalyst loading impregnated at a level of ca. 0.3 mg/cm$^2$ dry ionomer. The impregnated electrodes were post-dried in a vacuum oven overnight at 200 degrees C. to completely eliminate the residual solvent. After the drying step all electrodes were soaked in 3N HNO$_3$ to ion-exchange the polymer to the acid (H$^+$) form. Finally, the electrode was rinsed in deionized water to remove any excess acid.

EXAMPLE 6

Electrode Containing Inventive Ionomer

Prototype methanol tolerant/insensitive cathodes were prepared using the same commercial base (ionomer-free) electrodes (PTFE-bonded Pt black based GDEs) of Example 4. The 5 cm$^2$ electrodes were completely dipped in a solution described in Example 5 (3% solids) and gently stirred to allow total saturation and penetration of the polymer. Upon removal the excess ionomer was wiped with a paper towel and the dipped electrodes were post-dried in a vacuum oven overnight at 200 degrees C. to completely eliminate the residual solvent. The dried electrode was soaked in 3N HNO$_3$ to convert the ionomer to acid (H$^+$) form, and then rinsed in excess de-ionized water to wash out the excess nitric acid. The prototype cathode GDE then consisted of unsupported 4.0 mg/cm$^2$ Pt black metal catalyst loading saturated at a level of ca. 0.5 mg/cm$^2$ of the dry ionomer.

EXAMPLE 7

Composite Solid Polymer Electrolytes

A composite membrane was prepared as follows: a 3% solids dimethyl sulfoxide solution was prepared using the solid polymer electrolyte of Example 3, as described in Example 5. This solution was diluted in half with ethanol to prepare a 1.5% solids in a 50/50 dimethyl sulfoxide/ethanol solution. This solution was then impregnated into a 22-micron thick support of an expanded polytetrafluoroethylene (ePTFE) according to the teaching of Bahar, et. al. in U.S. Patent N0 RE37,307. The ePTFE was fixed in a 4-in embroidery hoop. The ionomer solution was painted on both sides of the ePTFE support and then dried with a hair drier to remove the solvents. The painting and drying steps were repeated 4 more times. The ePTFE and the embroidery hoop were then placed into a solvent oven set at 190° C. for 10 minutes to completely remove all solvent traces. The sample was then removed from the oven, allowed to cool to room temperature and finally taken off the embroidery hoop. The ePTFE/solid polymer electrolyte composite membrane was transparent, indicating substantially complete impregnation of the support by the solid polymer electrolyte.

Figure 9:
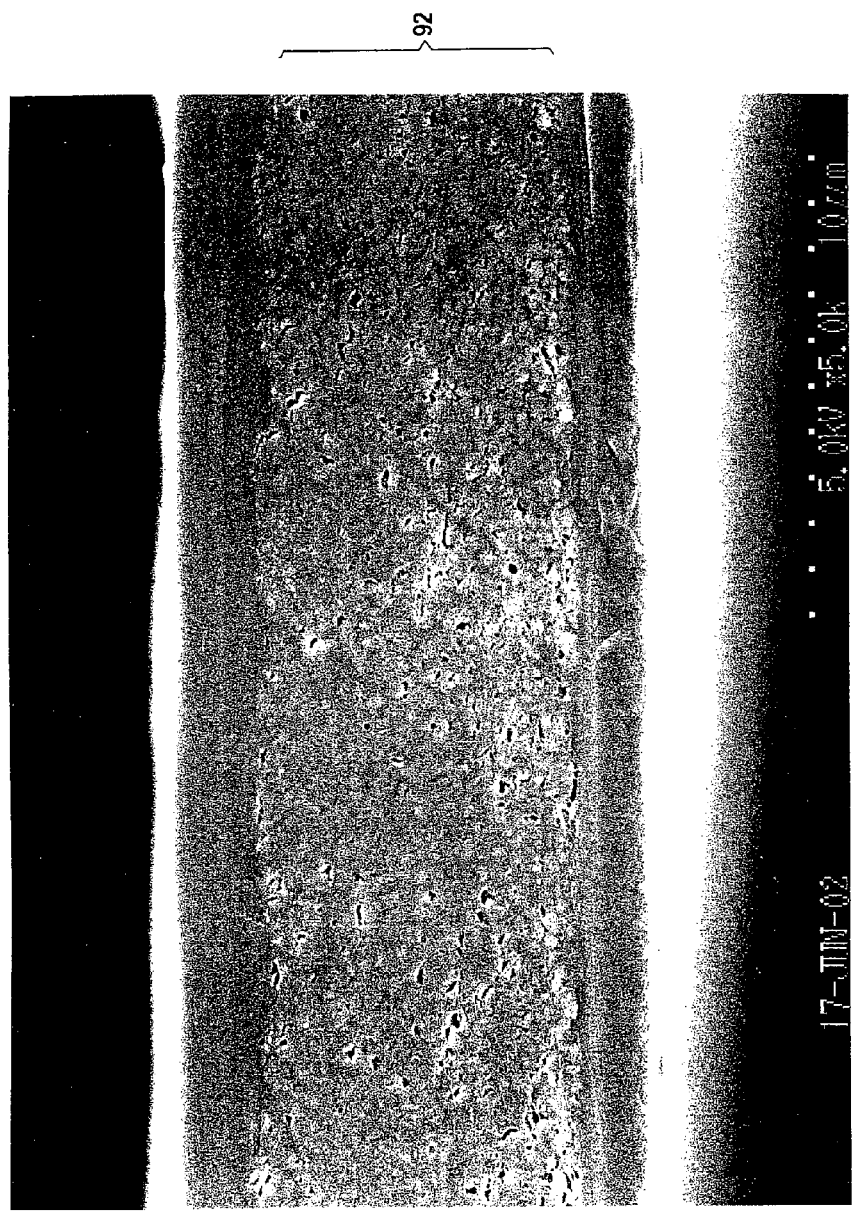
FIG. 9 is a scanning electron micrograph of a composite solid polymer electrolyte as prepared in Example 7.

The SEM micrograph of FIG. 9 is a cross-sectional image of the resulting composite solid polymer electrolyte membrane. The solid polymer electrolyte that acts herein as an ionomer is substantially impregnated throughout the porous microstructure of fibrils in the ePTFE as shown in the composite layer 92.

EXAMPLE 8 sPPES Polymer Preparation 1.2834 gram (2.8 milli mole) of disodium 3,3'-sulfonylbis (4-fluorophenyl sulfone), 1.0679 gram (4.2 milli mole) of bis(4-fluorophenyl)sulfone, 1.6677 gram (7 milli mole) 4-(4-hydroxyphenyl) phthalazinone and 1.1609 gram (8.4 mini mole) potassium carbonate, 30 milliliter of toluene, 20 milliliter of tetramethylene sulfone were charged to a 3-necked bottle, which equipped with nitrogen purge supply, cooling condenser, and mechanical agitator. Under protection of nitrogen blanket, the bottle was heated to 200° C. for 10-hour of polymerization. During the polymerization, water was generated and was removed by azeotropic boiling with toluene. After cooling, the reaction product was diluted with tetramethylene sulfone, followed by coagulation in water. The coagulant was filtered three times, then dried in a vacuum oven at 100° C. The obtained product has a reduced viscosity of 1.74 dl/g, and thermal weight loss of 10% at 533° C.

EXAMPLE 9

SPPES Polymer Preparation 0.9625 gram (2.1 milli mole) of disodium 3,3'-sulfonylbis (4-fluorophenyl sulfone), 1.2459 gram (4.9 milli mole) of bis(4-fluorophenyl)sulfone, 1.6677 gram (7 milli mole) 4-(4-hydroxyphenyl) phthalazinone and 1.1609 gram (8.4 milli mole) potassium carbonate, 30 milliliter of toluene, 20 milliliter of tetramethylene sulfone were charged to a 3-necked bottle, which equipped with nitrogen purge supply, cooling condenser, and mechanical agitator. Under protection of nitrogen blanket, the bottle was heated to 200° C. for 10-hour of polymerization. During the polymerization, water was generated and was removed by azeotropic boiling with toluene. After cooling, the reaction product was diluted with tetramethylene sulfone, followed by coagulation in water. The coagulant was filtered three times, then dried in a vacuum oven at 100° C. The obtained product has a reduced viscosity of 1.45 dl/g, and thermal weight loss of 10% at 534° C.

Characterization Of Examples And Comparative Examples

To characterize the utility of the inventive polymer when used as a solid polymer electrolyte, the assembled fuel cell fixture of Example 4A was connected to a fuel cell testing plant for cell diagnostics. The fuel cell testing plant consisted of an electronic load, a gas-control unit, methanol injection setup and ancillary equipment (condenser, gas line heat tracing, etc.) The electronic load was a Scribner & Assoc. (VA) 10 A model 890B-100 and was used for fuel cell mode $H_2$/air and methanol/air polarization analysis. The electronic load box also contained standard temperature controllers for the cell and the reactant humidifiers. The load interfaced with a PC running Scribner & Assoc. fuel cell software (version 3.1a) for data acquisition and analysis.

The basic gas unit was made by Globetech CMIX and after "in house" modifications consisted of 3 liter reactant humidifier bottles for $H_2$ and air, both with independent temperature control. The station also had mass flow controllers and back-pressure regulators for the gaseous reactants. The gas feeds could also be delivered humidified or dry to the cell via a 3 way valve manifold. The cell is connected to this gas unit with its feeds heat traced and temperature controlled.

The methanol injection was done via a secondary manifold to the anode cell feed. The apparatus consists of a methanol solution reservoir (1 liter 3-head Pyrex flask) in which a $N_2$ blanket was continuously bubbled, a 2-syringe injection-withdrawn pump (Kd Scientific, model 210 C) with flow control, and a 100 cc accumulation volume (to avoid flow fluctuations) placed in the injection manifold right before the cell. The injection setup could be isolated from the cell via an array of on/off valves that allowed the switching from $H_2$ to methanol solution as the anode fuel.

Once the fuel cell fixture was hooked up to the test station, the cell temperature was then set to 60 degrees C., the anode and cathode bottles were set to 70 degrees C. and 65 degrees C., respectively. The back-pressure was kept at 0 psig on both sides, and the heat-traces on the gas lines were set to 75 and 70 degrees C. for anode and cathode respectively. The hydrogen fuel was then supplied to the anode at a flow rate of 100 ml/min and the air was supplied at the cathode at a flow rate of 200 ml/min. Once the cell temperature had reached the set value, the cell was allowed to condition for a minimum of 6 hours. During this conditioning time, the cell potential was potentiostatically cycled between 0.6V, 0.3V, and 0.8V in 0.2V potential step increments. As is generally practiced in the art, voltages are versus the hydrogen dynamic electrode, i.e., flowing hydrogen gas at the anode with no separate reference electrode used. The cell was maintained at each step for a 5 to 10 minutes time period. At the end of the fuel cell potential cycling, the anode reactant and cathode reactant minimum flow rates were dropped to 20 ml/min and 40 ml/min, respectively, to allow for flow to track the load (i.e., stoichiometric control). The cell was then operated under constant stoichiometry using 1.2× stoichiometry on the anode, and at 2.5× stoichiometry on the cathode. Stoichiometric flow is defined as gas flow at any given current density such that the gas would be completely consumed in the fuel cell reaction. The fuel cell was again cycled at least twice between 0.6V, 0.3V and 0.8V to reach steady state under stoichiometric control mode. Finally, a polarization curve was obtained by recording the steady state current after 5 to 10 minutes following sequential voltages. The step increment was 0.1 V for the comparative examples, and 0.05V for the inventive example. The polarization curve was started from 0.6V and potential steps were first taken towards lower voltages; then the cell was taken back to 0.6V to equilibrate and the potential steps were taken towards open circuit voltage. The open circuit voltage (OCV) is defined as the maximum voltage obtained from the trace of OCV versus time after the load is removed from the cell. Additionally, at each potential the cell resistance was measured by using a standard current interrupt technique available through the Scribner Version 3.1a (Firmware Version 1.43) software used to control the system.

Once the polarization curve was completed, the fuel cell was shutdown for the night and the cell, humidification bottles and heat trace temperatures were dropped down to room temperature. The fuel cell was re-started the next day according to the same start-up protocol described above. The cell potential was again cycled between 0.6V, 0.3V and 0.8V to condition the fuel cell. If the cell performance was comparable to that of the first day, a second polarization curve was recorded to confirm the performance. If the cell performance was better on the second day than the first day, then the cell was cycled for a minimum of four more hours and a polarization curve was obtained at the end of this conditioning period. The polarization curves obtained on the second day were used for MEA comparison and are reported in FIG. 7.

The fuel cell was then switched from hydrogen/air mode to methanol/air mode (direct methanol fuel cell or DMFC mode). The anode side of the fuel cell was first flushed with nitrogen and then a 1M-methanol solution was pumped at 1 ml/min to the anode side using a Kd Scientific injection-withdrawn pump. The cathode was switched to dry air and set at a flow rate of 100 ml/min. The fuel cell was cycled between 0.3V, 0.1V and 0.6 V in 0.3 V potential steps to condition the MEA. The fuel cell was maintained at each potential step for a 5 to 10 minutes time period. After cycling the cell in DMFC mode for a minimum of 3 hours, a DMFC polarization curve was recorded in a similar fashion as reported before. In this case, the polarization curve was started from 0.3 V and the potential was first lower to 0V in 0.05 V step increments; then the cell was taken back to 0.3V and the potential was increased to open circuit voltage, in 0.05 V step increment. The OCV was measured as described above.

Figure 6:
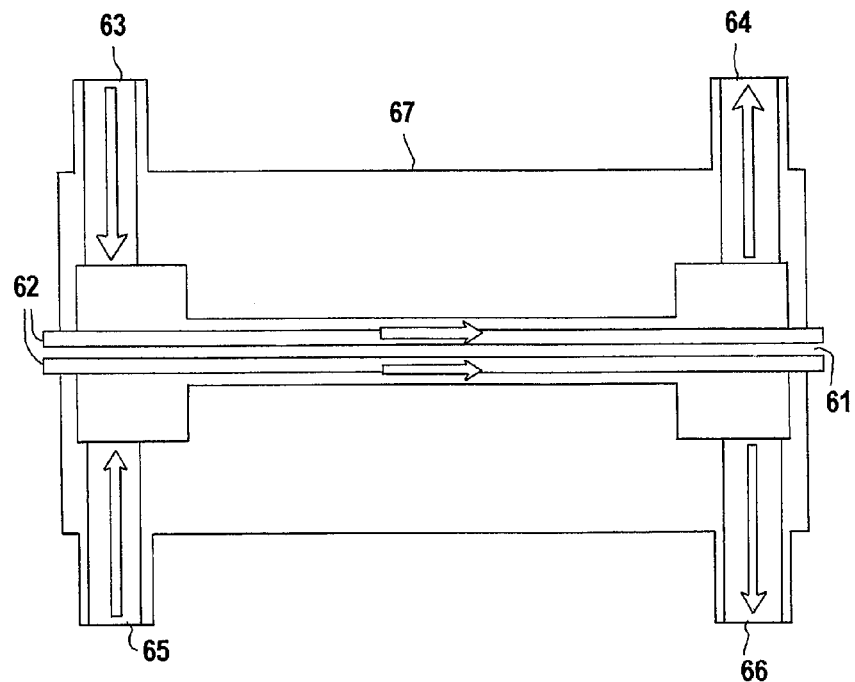
FIG. 6 is a schematic of a cell used to measure the permeance of ionomers to methanol solutions.
Figure 7:
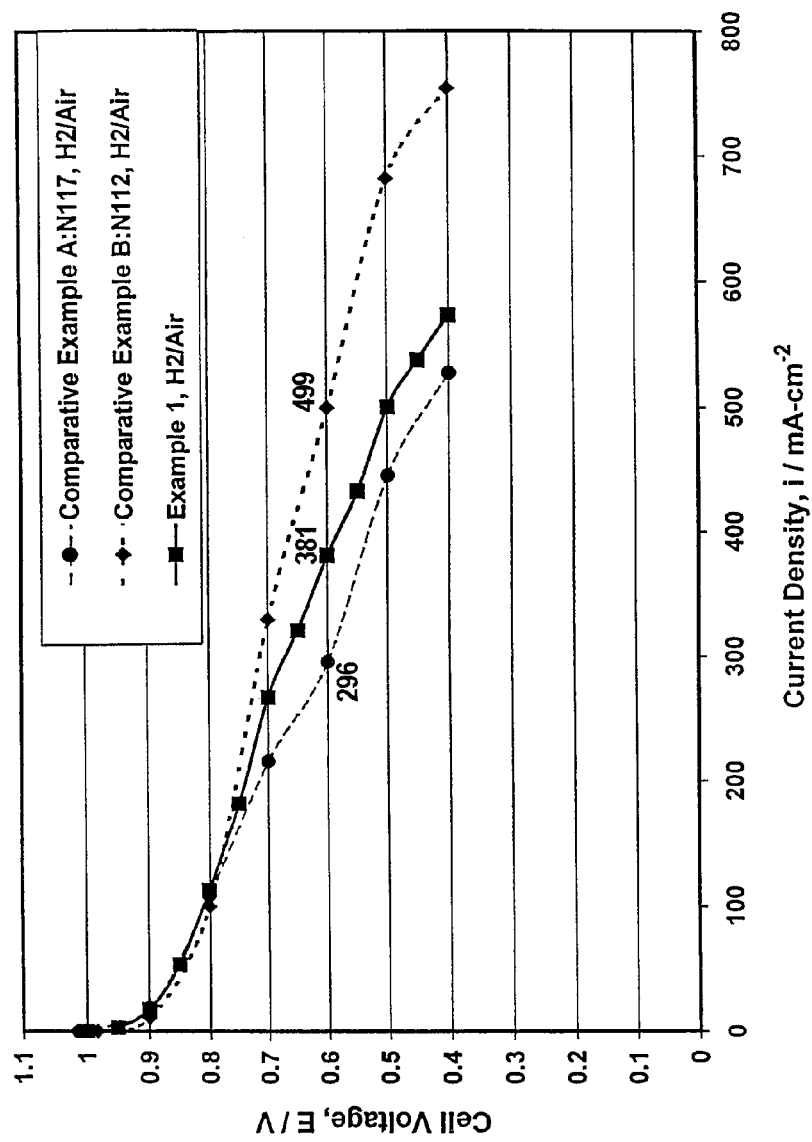
FIG. 7 is polarization curves comparing the results of hydrogen-air fuel cells using the inventive solid polymer electrolyte and two different known commercial materials.
Figure 8:
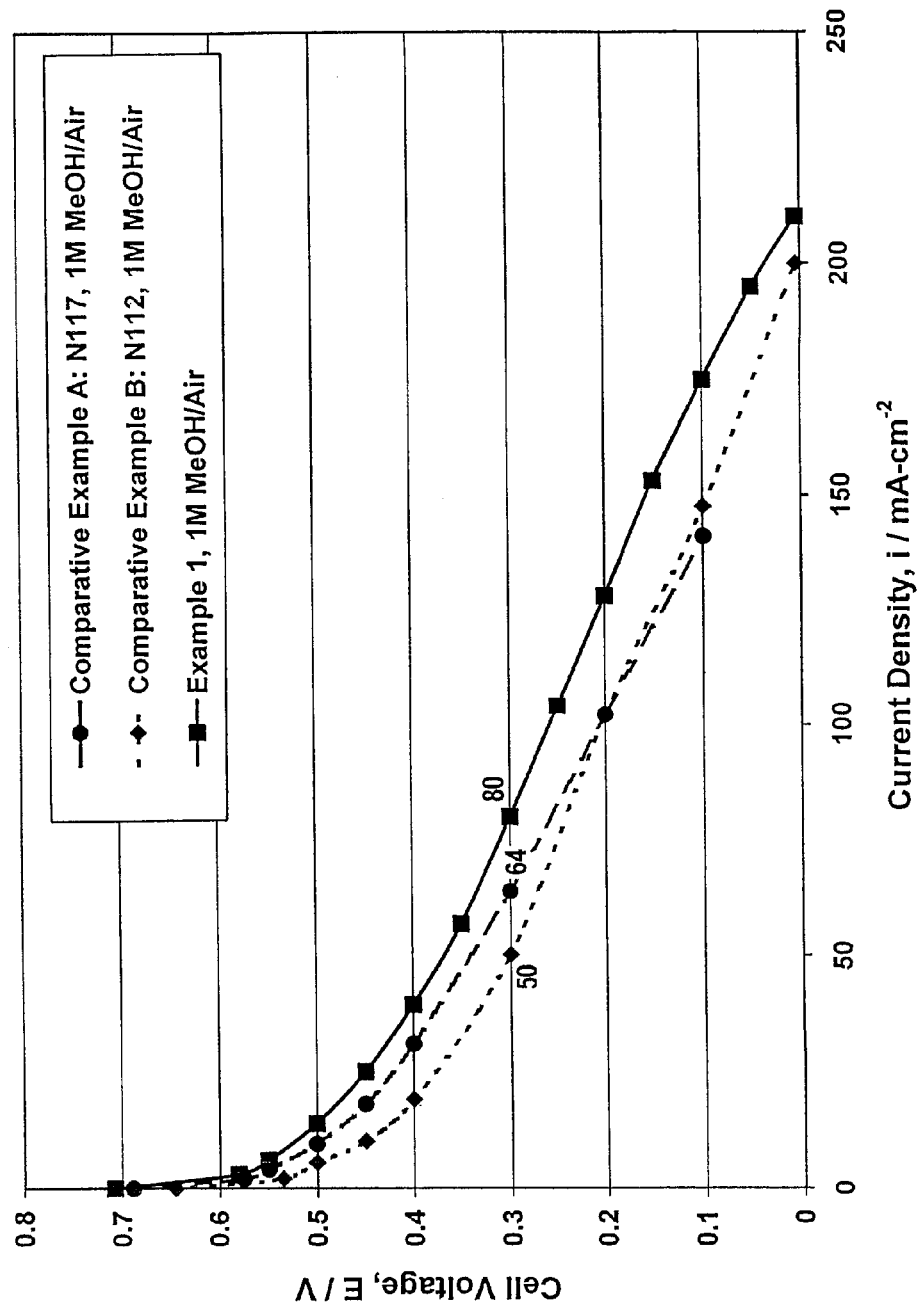
FIG. 8 is polarization curves comparing the results of methanol-air fuel cells using the inventive solid polymer electrolyte and two different known commercial materials.

The polarization results of the tests for hydrogen-air and methanol-air are shown in FIGS. 6 and 7 respectively. In hydrogen-air (FIG. 6), above ~0.75 V, the inventive polymer had fuel performance comparable to the comparative examples, while at lower voltages, its fuel performance is between the two comparative examples, a surprisingly good result for a non-fluorinated polymer, particularly given the thickness of the membrane. In methanol-air (FIG. 7), the performance of the inventive solid polymer electrolyte is superior to both comparative examples at all potentials. At 0.3V, the current density of the MEA prepared with the inventive polymer is 80 mA/cm$^2$ while the current density of the NAFION 112 and the NAFION 117 based MEAs are 50 mA/cm$^2$ and 61 mA/cm$^2$, respectively: a 60% and 31% performance improvement over NAFION® 112 and NAFION® 117 MEAs, respectively. Also, the measured open circuit potential of 0.704 V for the inventive solid polymer electrolyte of Example 3 is higher than either comparative example A, 0.683 V, or Comparative Example B, 0.645, indicative of improved performance.

The results of an electrochemical methanol crossover measurement (Table 2) indicate that the inventive solid polymer electrolyte has lower electrochemical methanol crossover than either Comparative Example A or B. This result is particularly surprising in that the inventive solid polymer electrolyte is about five times thinner than Comparative Example A and still has lower crossover.

TABLE 2

Electrochemical Methanol Crossover Measurement

|  | Comparative Example A: N117 | Comparative Example B: N112 | Example 4A |
|---|---|---|---|
| Scan 1 | 0.138 | 0.322 | 0.129 |
| Scan 2 | 0.136 | 0.315 | 0.127 |
| Scan 3 | 0.120 | 0.289 | 0.116 |
| Average | 0.131 | 0.309 | 0.124 |
| Stddev | 0.009 | 0.017 | 0.007 |

*Results reported in units of micromole/cm$^2$-sec

The examples and specific embodiments presented herein are intended to illustrate the invention but not to limit it in any way. Rather, the scope of the present invention is embraced by the following claims.

We claim:

1. An ionomer comprising the reaction product of monomer A with monomer B and C, wherein the moles of monomers B plus C equal the moles of A, wherein $R_{1-4}$ are independently H, linear or branched alkyl, aromatic, or halogen; $X_1$ and $X_2$ are independently a carbonyl or sulfone radical or aromatic compounds connected through a ketone or sulfone linkage; Y is independently a halogen group, and M is an alkali metal

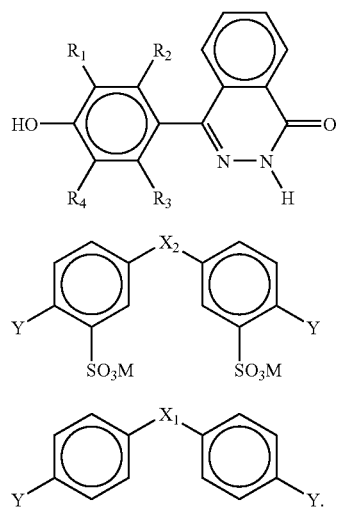

2. An ionomer as defined in claim 1 wherein monomer A comprises 4-(4-hydroxyphenyl) phthalazinone.

3. An ionomer as defined in claim 1 wherein monomer B comprises disodium 3,3'-sulfonyl(4,4'-difluorobenzophenone).

4. An ionomer as defined in claim 1 wherein monomer C comprises 4,4'-difluorobenzophenone.

5. An ionomer as defined in claim 1 wherein monomer A comprises 4-(4-hydroxyphenyl) phthalazinone, monomer B comprises disodium 3,3'-sulfonyl(4,4'-difluorobenzophenone), and monomer C comprises 4,4'-difluorobenzophenone.

6. An ionomer as defined in claim 1 wherein monomer B comprises disodium 3,3'-sulfonylbis(4-fluorophenyl sulfone).

7. An ionomer as defined in claim 1 wherein monomer C comprises bis(4-fluorophenyl)sulfone.

8. An ionomer as defined in claim 1 wherein monomer A comprises 4-(4-hydroxyphenyl) phthalazinone, monomer B comprises disodium 3,3'-sulfonylbis(4-fluorophenyl sulfone), and monomer C comprises bis(4-fluorophenyl)sulfone.

9. An ionomer comprising the reaction product of monomer A with monomer B and C in an azeotroping solvent mixed with an inert aprotic polar solvent containing at least 2 moles of an alkali metal base for each mole of monomer A, wherein the moles of monomers B plus C equal the moles of A, said reaction driven to completion by the azeotropic removal of water at a temperature above the azeotropic boiling point of the azeotroping solvent in the presence of water, wherein $R_{1-4}$ are independently H, linear or branched alkyl, aromatic, or halogen; $X_1$ and $X_2$ are independently a carbonyl or sulfone radical or aromatic compounds connected through a ketone or sulfone linkage; and Y is a halogen group

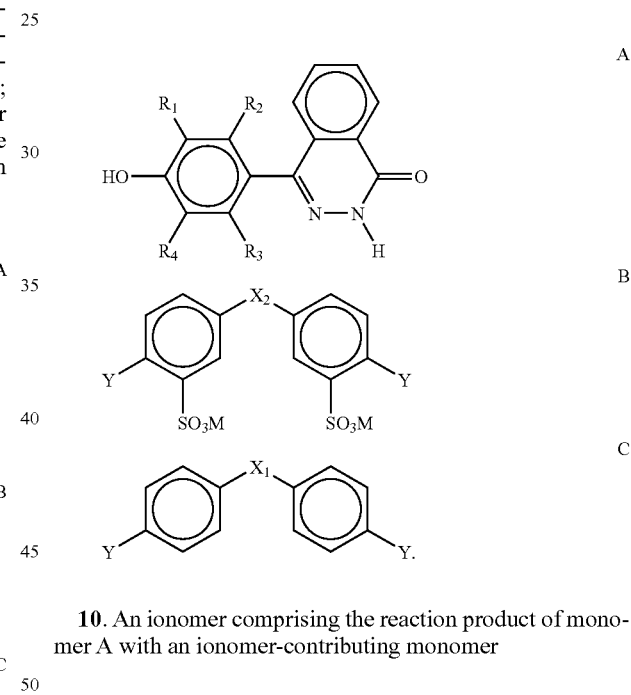

10. An ionomer comprising the reaction product of monomer A with an ionomer-contributing monomer

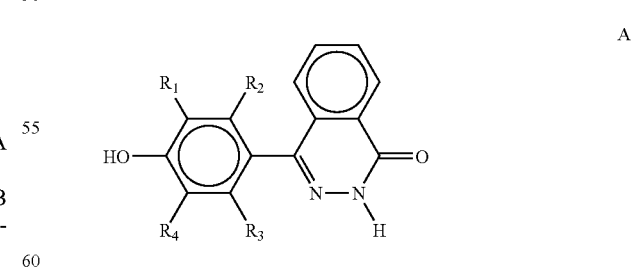

wherein $R_{1-4}$ are independently H, linear or branched alkyl, aromatic, or halogen.

11. An ionomer as defined in claim 10 wherein said ionomer-contributing monomer comprises sulfonic acid.

12. An ionomer as defined in claim 10 wherein said ionomer-contributing monomer comprises carboxylic acid.

13. A sulfonated Poly(phthalazinone ether ketone) s, comprising repeating units of the polymers shown below:

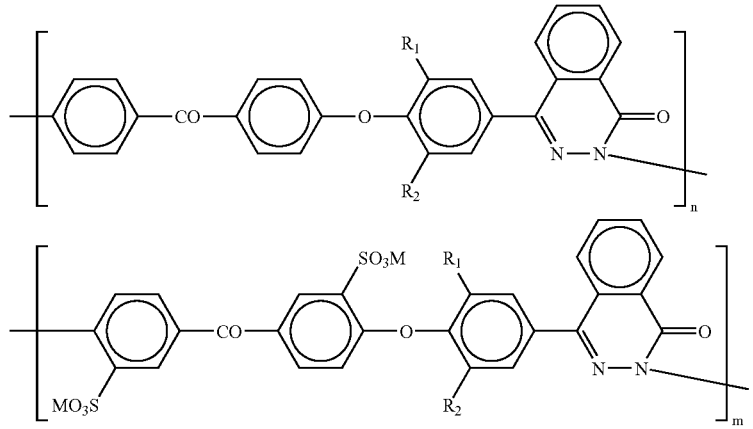

wherein $R_1$ and $R_2$ are selected from hydrogen atom, alkyl group, or aromatic group and M is metallic base ion.

14. A method of preparing a sulfonated poly(phthalzinone ether ketone) comprising the steps of
  (a) copolymerizing 4,4'-dihalo (or dinitro)-3,3'-disulfonate salt of benzophenone, dihalo (or dinitro) benzophenone, and a monomer containing phthalazinone and phenol group, in polar solvents or reaction medium containing mainly polar solvents, in the presence of a catalyst comprising a metallic base (or its salt), to obtain a product;
  (b) dehydrating said product at high temperature using azeotropic dehydration agents;
  (c) diluting said product with solvents;
  (d) coagulating said product using coagulation agents;
  (e) separating said product;
  (f) drying said product; and
  (g) performing steps (c) through (f) two additional times to obtain said sulfonated poly(phthalazinone ether ketone).

15. The preparation method of claim 14, wherein the reaction temperature is 150-220° C. and the reaction time is 4-32 hours.

16. The preparation method of claim 14, wherein the polar solvents are dimethyl sulfoxide, tetramethylene sulfone, phenyl sulfone, 1-methyl-2-pyrrolidinone, N,N-dimethylformamide.

17. The preparation method of claim 14, wherein the azeotropic dehydration agents are selected from the group consisting of toluene, xylene, and chloroform.

18. The preparation method of claim 14, wherein the coagulation agents are water and one of the group of methanol and ethanol.

19. A sulfonated poly(phthalazinone ether sulfone) comprising repeating units of the polymers shown below:

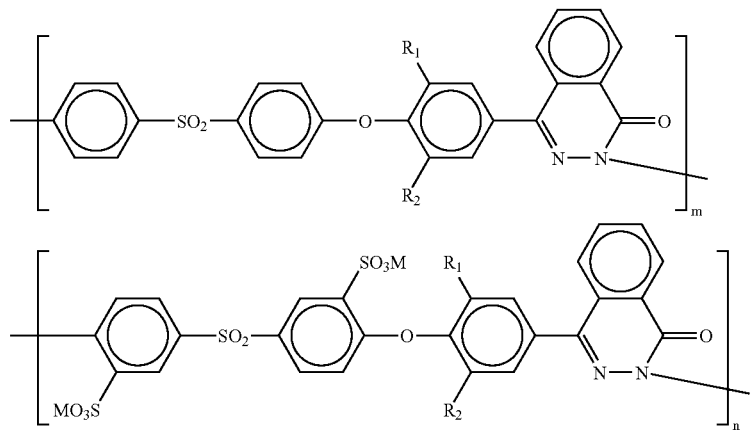

wherein $R_1$ and $R_2$ are selected from hydrogen atom, C1-C4 linear or branch alkyl group, or aromatic group, M is sodium or potassium ion, m+n.> or =20.

20. A method of preparing a sulfonated poly(phthalazinone ether sulfone), comprising the steps of
  (a) copolymerizing 4,4'-dihalo (or dinitro)-3,3-disulfonate salt of phenyl sulfone, dihalo (or dinitro) phenyl sulfone, and a monomer containing phthalazinone and phenol group, in polar solvents or reaction medium containing mainly polar solvents, in the presence of a catalyst comprising a metallic base (or its salt), to obtain a product;

(b) dehydrating said product at high temperature using azeotropic dehydration agents;

(c) diluting said product with solvents;

(d) coagulating said product using coagulation agents;

(e) separating said product from said agents;

(f) drying said product; and (g) performing steps (c) through (f) two additional times to obtain said sulfonated poly(phthalazinone ether sulfone).

21. The preparation method of claim 20, wherein the monomer containing phthalazinone and phenol group has the following molecular structure:

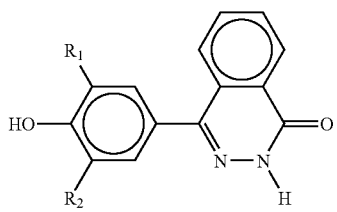

wherein $R_1$ and $R_2$ are selected from hydrogen atom, C1-C4 linear or branch alkyl group, or aromatic group.

22. The preparation method of claim 20, wherein the reaction temperature is 140-220° C. and the reaction time is 1-36 hours.

23. The preparation method of claim 20, wherein the polar solvents are dimethyl sulfoxide, tetramethylene sulfone, phenyl sulfone, 1-methyl-2-pyrrolidinone, and N,N-dimethylformamide.

24. The preparation method of claim 20, wherein the azeotropic dehydration agents are toluene, xylene, or chloroform.

25. The preparation method of claim 20, wherein the coagulation agents are water and methanol (or ethanol).

26. A method for generating electricity comprising the steps of:

(a) providing an anode;

(b) providing a cathode;

(c) providing a polymer electrolyte membrane between said anode and said cathode and in communication with said anode and said cathode, said polymer electrolyte membrane comprising the ionomer of claim 1 in acid form (d) flowing a fuel to said cathode where said fuel is disassociated to release a proton and an electron;

(e) transporting said proton across said polymer electrolyte membrane to said anode; and (f) collecting said electron at a collector to generate electricity.

27. A method as defined in claim 26 wherein said polymer electrolyte membrane comprises a polymeric support having interconnected passages and pathways that are substantially occluded by said polymer.

28. A method as defined in claim 26 wherein said polymeric support is expanded polytetrafluoroethylene.

29. A method as defined in claim 26 wherein said fuel is methanol.

30. A method as defined in claim 26 wherein said fuel is hydrogen.

31. A method as defined in claim 27 wherein said fuel is methanol.

32. A method as defined in claim 27 wherein said fuel is hydrogen.

33. A method as defined in claim 28 wherein said fuel is methanol.

34. A method as defined in claim 28 wherein said fuel is hydrogen.

35. A polymer electrolyte membrane comprising the ionomer of claim 1 in acid form.

36. A polymer electrolyte membrane as defined in claim 35 further comprising a polymeric support having interconnected passages and pathways that are substantially occluded by said ionomer.

37. A polymer electrolyte membrane as defined in claim 36 wherein said polymeric support is expanded polytetrafluoroethylene.

38. A membrane electrode assembly comprising:

(a) an anode;

(b) a cathode; and (c) a polymer electrolyte membrane between said anode and said cathode and in communication with said anode and said cathode, said polymer electrolyte membrane comprising the ionomer of claim 1 in acid form.

39. A membrane electrode assembly as defined in claim 38 wherein said polymer electrolyte membrane comprises a polymeric support having interconnected passages and pathways that are substantially occluded by said ionomer.

40. A membrane electrode assembly comprising:

(a) an anode;

(b) a cathode; and (c) a polymer electrolyte membrane between said anode and said cathode and in communication with said anode and said cathode; wherein at least one of said anode and said cathode comprises the ionomer of claim 1.

41. A membrane electrode assembly comprising:

(a) an anode;

(b) a cathode; and (c) a polymer electrolyte membrane between said anode and said cathode and in communication with said anode and said cathode, said polymer electrolyte membrane comprising the ionomer of claim 1 in acid form, (d) wherein said polymer electrolyte membrane has a relative selectivity factor greater than 1.0.

42. A membrane electrode assembly as defined in claim 41 wherein said relative selectivity factor is about 1.3.

43. A membrane electrode assembly comprising:

(a) an anode;

(b) a cathode; and (c) a polymer electrolyte membrane between said anode and said cathode and in communication with said anode and said cathode, said polymer electrolyte membrane comprising the ionomer of claim 5 in acid form.

44. A fuel cell comprising the membrane electrode assembly of claim 38 sandwiched between a first gas diffusion medium and a second gas diffusion medium, said membrane electrode assembly being in electronic communication with a current collector.

45. A fuel cell as defined in claim 44 wherein said polymer electrolyte membrane comprises a polymeric support having interconnected passages and pathways that are substantially occluded by said ionomer.

46. A fuel cell as defined in claim 45 wherein said polymeric support is expanded polytetrafluoroethylene.

47. A fuel cell as defined in claim 44 wherein said fuel cell is a direct methanol fuel cell.

48. A fuel cell as defined in claim 44 herein said fuel cell uses hydrogen as a fuel.

49. A fuel cell as defined in claim 45 wherein said fuel cell is a direct methanol fuel cell.

50. A fuel cell as defined in claim 45 wherein said fuel cell uses hydrogen as a fuel.

51. A fuel cell as defined in claim 46 wherein said fuel cell is a direct methanol fuel cell.

52. A fuel cell as defined in claim 46 wherein said fuel cell uses hydrogen as a fuel.

53. A fuel cell as defined in claim 44 having an open circuit potential of 0.704 V.

54. A fuel cell as defined in claim 44 having an average methanol crossover measurement of about 0.124.

* * * * *